(12) United States Patent
Privault et al.

(10) Patent No.: US 8,756,503 B2
(45) Date of Patent: Jun. 17, 2014

(54) QUERY GENERATION FROM DISPLAYED TEXT DOCUMENTS USING VIRTUAL MAGNETS

(75) Inventors: Caroline Privault, Montbonnot-Saint-Martin (FR); Jacki O'Neill, Grenoble (FR); Yves Hoppenot, Notre-Dame-de-Mésage (FR); Fabien Guillot, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 296 days.

(21) Appl. No.: 13/031,336

(22) Filed: Feb. 21, 2011

(65) Prior Publication Data
US 2012/0216114 A1 Aug. 23, 2012

(51) Int. Cl.
*G06F 3/01* (2006.01)
(52) U.S. Cl.
USPC ........... 715/702; 715/769; 715/805; 715/846; 715/859; 715/860
(58) Field of Classification Search
None
See application file for complete search history.

(56) References Cited

U.S. PATENT DOCUMENTS

| | | | |
|---|---|---|---|
| 5,920,313 A | 7/1999 | Diedrichsen et al. | |
| 5,982,370 A | 11/1999 | Kamper | |
| 6,714,222 B1 * | 3/2004 | Bjorn et al. | 715/839 |
| 6,839,702 B1 | 1/2005 | Patel et al. | |
| 7,058,567 B2 | 6/2006 | Aït-Mokhtar et al. | |
| 7,512,900 B2 * | 3/2009 | Lynch et al. | 715/825 |
| 7,711,747 B2 | 5/2010 | Renders et al. | |
| 7,720,848 B2 | 5/2010 | Guerraz et al. | |
| 7,813,919 B2 | 10/2010 | Goutte et al. | |
| 2005/0223030 A1 * | 10/2005 | Morris et al. | 707/104.1 |
| 2007/0271524 A1 * | 11/2007 | Chiu et al. | 715/767 |
| 2007/0288498 A1 * | 12/2007 | Dietz et al. | 707/102 |
| 2008/0071519 A1 | 3/2008 | Brun et al. | |
| 2008/0165136 A1 | 7/2008 | Christie et al. | |
| 2008/0307359 A1 | 12/2008 | Louch et al. | |
| 2008/0319978 A1 | 12/2008 | Brun et al. | |
| 2009/0077488 A1 | 3/2009 | Ording | |
| 2009/0100343 A1 * | 4/2009 | Lee et al. | 715/733 |
| 2009/0204596 A1 | 8/2009 | Brun et al. | |
| 2009/0307623 A1 | 12/2009 | Agarawala et al. | |
| 2010/0082331 A1 | 4/2010 | Brun et al. | |

(Continued)

OTHER PUBLICATIONS

Lagos, et al. "Event extraction for legal case building and reasoning," IIP 2010—6th Int'l Conf. on Intelligent Information Processing, Oct. 13-16, 2010.

(Continued)

*Primary Examiner* — Anil N Kumar
(74) *Attorney, Agent, or Firm* — Fay Sharpe LLP

(57) ABSTRACT

A system and method are provided for dynamically generating a query using touch gestures. A virtual magnet is movable on a display device of a tactile user interface in response to touch. A user selects one of a set of text documents for review, which is displayed on the display. The system is configured for recognizing a highlighting gesture on the tactile user interface over the displayed document as a selection of a text fragment from the document text. The virtual magnet is populated with a query which is based on the text fragment selected with the highlighting gesture. The populated magnet is able to cause a subset of displayed graphic objects to exhibit a response to the magnet as a function of the query and the text content of the respective documents which the objects represent and/or to cause responsive instances in a text document to be displayed.

26 Claims, 15 Drawing Sheets

(56) References Cited

U.S. PATENT DOCUMENTS

| | | | |
|---|---|---|---|
| 2010/0088073 A1 | 4/2010 | Perronnin | |
| 2010/0169828 A1* | 7/2010 | Kho et al. | 715/810 |
| 2010/0312725 A1 | 12/2010 | Privault et al. | |
| 2010/0313124 A1 | 12/2010 | Privault et al. | |
| 2010/0318398 A1 | 12/2010 | Brun et al. | |
| 2011/0213655 A1* | 9/2011 | Henkin et al. | 705/14.49 |

OTHER PUBLICATIONS

Capet, et al. "A Risk Assessment System with Automatic Extraction of Event Types", IIP, 2008.

Multi-Touch G³-Touch Screen from PQ Labs, California http://multi-touch-screen.net—accessed Jan. 18, 2011.

Microsoft Surface™ touch-screen table http://www.microsoft.com/surface/—accessed Jan. 18, 2011.

Ullmer, et al. "Tangible Query Interfaces: Physically Constrained Tokens for Manipulating Database Queries," Proceedings of Interact '03, 2003.

Hinrichs, et al. "Examination of Text-Entry Methods for Tabletop Displays," Proc. IEEE Tabletop, pp. 105-112 (2007).

Morris, et al., "Search on surfaces: Exploring the potential of interactive tabletops for collaborative search tasks," Information Processing and Management 46, pp. 703-717, Nov. 2010.

Ait-Mokhtar, et al., "Incremental Finite-State Parsing," Proceedings of Applied Natural Language Processing, Washington, Apr. 1997.

Aït-Mokhtar, et al., "Subject and Object Dependency Extraction Using Finite-State Transducers," Proceedings ACL'97 Workshop on Information Extraction and the Building of Lexical Semantic Resources for NLP Applications, Jul. 1997.

Abney S., "Parsing by Chunks," in Principle-based Parsing (Robert Berwick, Steven Abney and Carol Teny, Eds., Kluwer Academics Publishers 1991.

Hartmann, et al. "Augmenting interactive tables with mice & keyboards," Proc. UIST, 149-152, 2009.

Privault, et al. "A new tangible user interface for machine learning document review," in J. Artificial Intelligence & Law, Jul. 3, 2010.

Ait-Mokhtar, et al. "Robustness Beyond Shallowness," Natural Language Engineering 8 (2/3): 121-144, 2002.

U.S. Appl. No. 12/480,002, filed Jun. 8, 2009, Privault, et al.
U.S. Appl. No. 12/479,972, filed Jun. 8, 2009, Privault, et al.
U.S. Appl. No. 12/976,196, filed Dec. 22, 2010, Hoppenot, et al.
U.S. Appl. No. 12/781,299, filed May 17, 2010, Castellani, et al.

* cited by examiner

QUERY GENERATION FROM DISPLAYED TEXT DOCUMENTS USING VIRTUAL MAGNETS

CROSS REFERENCE TO RELATED PATENTS AND APPLICATIONS

The following copending applications, the disclosures of which are incorporated herein in their entireties by reference, are mentioned:

U.S. application Ser. No. 12/480,002, filed on Jun. 8, 2009, entitled MANIPULATION OF DISPLAYED OBJECTS BY VIRTUAL MAGNETISM, by Caroline Privault, et al. (now U.S. Pub. No. 2010/0313124, published Dec. 9, 2010), hereinafter, "Privault 2009."

U.S. application Ser. No. 12/479,972, filed on Jun. 8, 2009, entitled SYSTEM AND METHOD FOR GUIDED DOCUMENT REVIEW, by Caroline Privault, et al. (U.S. Pub. No. 20100312725, published Dec. 9, 2010, hereinafter, "Privault 2010."

U.S. application Ser. No. 12/976,196, filed on Dec. 22, 2010, entitled SYSTEM AND METHOD FOR COLLABORATIVE GRAPHICAL SEARCHING WITH TANGIBLE QUERY OBJECTS ON A MULTI-TOUCH TABLE, by Yves Hoppenot, et al.

U.S. application Ser. No. 12/781,299, filed on May 17, 2010, entitled METHOD AND SYSTEM TO GUIDE FORMULATION OF QUESTIONS FOR DIGITAL INVESTIGATION ACTIVITIES, by Stefania Castellani, et al.

BACKGROUND

The exemplary embodiment relates to an apparatus and method for manipulations of graphic objects. It relates particularly to a tactile user interface which displays a virtual magnet that allows displayed graphic objects, such as text documents, to be manipulated as a function of attributes of underlying items that the objects represent, through finger or implement-guided movement of the magnet. Multi-touch interactive systems using specific user-interface designs and capabilities allow users to navigate easily through interactive content on multi-touch screens of interactive tables, interactive windows, multi-touch tablet computers, and multi-touch tablet PCs, all of which are referred to herein as tactile user interfaces (TUIs). TUIs incorporate a display device and touch-screen which detects user hand or implement movements. The detected movements are translated into commands to be performed, in a similar manner to conventional user interfaces which employ keyboards, cursor control devices, and the like.

However, translating the design of standard graphical user interfaces to multi-touch interactive devices is not always straightforward. This can lead to complex manipulations that the user may need to memorize in order to use the functionality provided by a touch-screen application. Additionally, hand movements often lack the precision which can be achieved with a keyboard and user fingers differ in size and shape, causing different touch signals to be sent from the touch-screen to the application.

For example, in the case of a large set of documents to be reviewed and classified, the repeated user actions of dragging each object, reviewing it, and then moving it to a selected file or other action may become wearing on the reviewer after an hour or two of such actions.

Another limitation of multi-touch interfaces is text-entry. Typing is often a requirement for entering data into a computer. However simply and accurately inputting text on tangible devices can be awkward for the user. While a physical keyboard could be plugged onto the multi touch-table, it may be confusing to the user to have to move repeatedly from screen interaction to keyboard interaction. Another option is to provide direct on-screen text-entry methods, such as soft keyboards, which are also known as virtual keyboards. A soft keyboard is an image of a keyboard on a touch screen. The user activates the keys by touch-tapping in a similar manner to touch-typing on a physical keyboard. In one such system, cameras may be positioned underneath the surface to capture an image of the user's hands and image recognition software employed to recognize the user's finger tips on the different virtual keys. This input is then processed by the computer and the result is displayed as text. In another system, an infra-red grid system is used. For example, a frame is permanently placed over an LCD screen with infra-red light senders and receivers placed on the frame edges. The soft keyboard can be rendered by displaying a keyboard image on the screen underneath the frame. The coordinates of the user's fingers intercepting the infrared beams by touching the key images are captured and transformed into text output.

In general, however, typing on soft keyboards is slower than on physical ones and tends to be less accurate. For the user, the tactile feel is also not the same as there is no force feed-back and if the user rests his fingers on or close to the key images, the device may register this as a key press. On projected systems, the shadows of the user's hands on the soft keyboard can sometimes blur the captured image of the selected keys and create inaccuracies. Another problem is that the keyboard display can obscure the other content of the display.

INCORPORATION BY REFERENCE

The following references, the disclosures of which are incorporated herein in their entireties by reference, are mentioned:

U.S. Pub. No. 20090077488, published Mar. 19, 2009, entitled DEVICE, METHOD, AND GRAPHICAL USER INTERFACE FOR ELECTRONIC DOCUMENT TRANSLATION ON A TOUCH-SCREEN DISPLAY, by Bas Ording, discloses a device incorporating a touch screen display and method for detecting a movement of an object on or near the touch screen display and translating an electronic document displayed on the touch screen display in response to the detected movement. An area beyond an edge of the electronic document is displayed in response to the edge of the electronic document being reached. In response to detecting that the object is no longer on or near the touch screen display, the document is translated in a second direction until the area beyond the edge of the document is no longer displayed.

U.S. Pub. No. 20080165136, published Jul. 10, 2008, entitled SYSTEM AND METHOD FOR MANAGING LISTS, by Greg Christie, et al., discloses a computer-implemented method for displaying and managing lists on a portable multifunction device with a touch screen display includes displaying a list of items, detecting a finger contact on a moving-affordance icon, detecting movement of the finger contact on the touch screen display, and in response to detecting the movement of the finger contact, moving the moving-affordance icon and the corresponding item in the list in accordance with the movement of the finger contact.

U.S. Pat. No. 6,714,222, issued Mar. 30, 2004, entitled GRAPHICAL USER INTERFACE FOR COMMUNICATIONS, by Staffan Bjorn, et al., discloses a graphical user interface which provides access to communications and other applications in a home environment by utilizing icons that appear like refrigerator magnets. The virtual magnets are displayed on a background of the screen and may be dragged to new locations by a user. Tapping on a virtual magnet activates a corresponding application.

Methods for extraction of named entities are disclosed for example, in U.S. Pub. No. 20080071519, published Mar. 20, 2008, entitled LABELING OF WORK OF ART TITLES IN TEXT FOR NATURAL LANGUAGE PROCESSING, by Caroline Brun, et al.; U.S. Pub. No. 20080319978, published Dec. 25, 2008, entitled HYBRID SYSTEM FOR NAMED ENTITY RESOLUTION, by Caroline Brun, et al.; and U.S. Pub. No. 20090204596, published Aug. 13, 2009, entitled SEMANTIC COMPATIBILITY CHECKING FOR AUTOMATIC CORRECTION AND DISCOVERY OF NAMED ENTITIES by Caroline Brun, et al.

Methods for extraction of events are disclosed for example, in U.S. Pub. No. 20100318398, published Dec. 16, 2010, entitled NATURAL LANGUAGE INTERFACE FOR COLLABORATIVE EVENT SCHEDULING, by Caroline Brun, et al.; and U.S. Pub. No. 20100082331, published Apr. 1, 2010, entitled SEMANTICALLY-DRIVEN EXTRACTION OF RELATIONS BETWEEN NAMED ENTITIES, by Caroline Brun, et al.

U.S. Pat. No. 7,058,567, entitled NATURAL LANGUAGE PARSER, by Salah Aït-Mokhtar, et al., discloses a finite state parser which may be utilized in natural language processing.

BRIEF DESCRIPTION

In accordance with one aspect of the exemplary embodiment, a method for dynamically generating a query includes providing a virtual magnet which is movable on a display device of a tactile user interface (TUI) in response to touching on the TUI. The method further includes providing for a user to select one of a set of text documents and displaying the selected text document on the display. A highlighting gesture on the TUI over the displayed document is recognized as a selection of a text fragment of the text content of the document. The virtual magnet is populated with a query which is based on the text fragment selected from the displayed text document by the highlighting gesture. The populated magnet is thereby configured for causing at least one of: a) at least a subset of displayed graphic objects to exhibit a response to the magnet as a function of the query and the text content of respective documents represented by the graphic objects, and b) responsive instances in a text document to be displayed.

In accordance with another aspect of the exemplary embodiment, a system for dynamically generating a query includes a tactile user interface-screen device comprising a display device for displaying text documents stored in associated memory and for displaying at least one virtual magnet, the virtual magnet being movable on the display, in response to touching on the TUI. Memory stores instructions for generating a query based on a user-selected fragment of one of the text documents displayed on the display device and for populating a virtual magnet with the query, the text fragment being selected by a highlighting gesture over one of the documents. A processor in communication with the memory implements the instructions.

In accordance with another aspect, a tactile user interface includes a display device including a touch-screen. Instructions are stored in memory for: i) displaying a set of graphic objects on the display device, each graphic object representing a respective text document, ii) causing a virtual magnet to move on the display device in response to touching on the touch-screen, iii) displaying one of the text documents in response to selection of a respective one of the graphic objects, iv) recognizing a highlighting gesture over the displayed text document as selection of a fragment of the text in the displayed text document, and v) populating the magnet with a query based on the selected text fragment. A processor in communication with the memory and display device executes the instructions.

DETAILED DESCRIPTION

Figure 1:
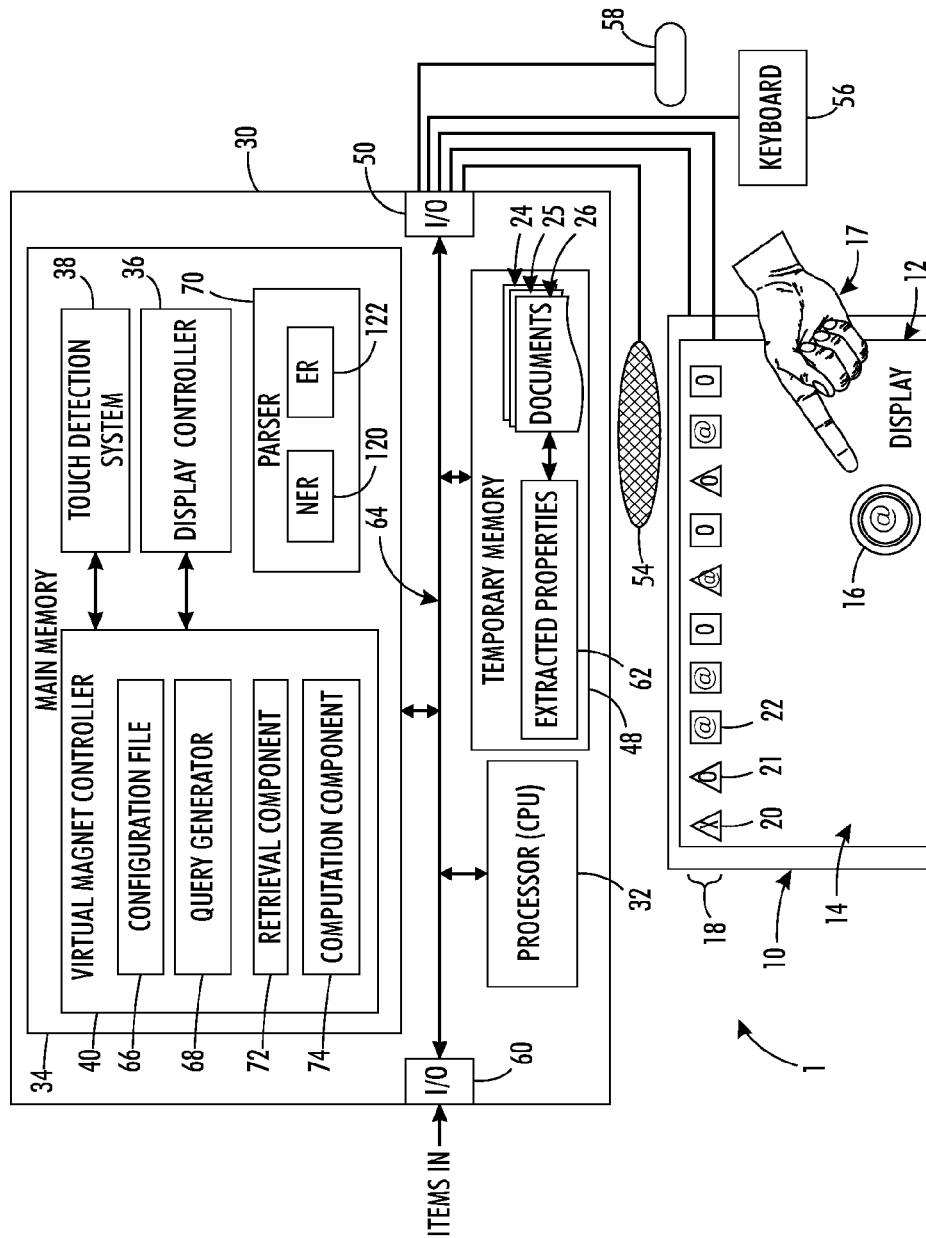
FIG. 1 is a functional block diagram of an exemplary apparatus incorporating a tactile user interface in accordance with one aspect of the exemplary embodiment.

The exemplary embodiment relates to a tactile user interface (TUI) and method of use. Documents can be displayed and manipulated on the interface by one or more users through natural gestures.

The exemplary TUI includes a display device including a touch-screen. The screen displays a set of graphic objects which represent items, such as documents. A virtual magnet is displayed on the screen and moves in response to touching on the touch-screen. A multi-touch tactile user interface suitable for use in the present application is described in Privault 2009, incorporated herein by reference, which can be modified and/or adapted for querying documents, as described herein.

Rather like a real magnet, the virtual magnet disclosed in Privault 2009 can "attract" or "repel" the items. In particular, a subset of the graphic objects exhibits a response to the virtual magnet. The response of each graphic object in the subset is a function of an attribute of the item represented by the graphic object. The user interacts with the TUI primarily through finger contacts and gestures on the touch-sensitive display device. The interaction can be through one or more finger touches and/or through a large touch area in contact with the screen, such as single first or hand palm, or any other object striking the screen. The touch screen display detects the user contacts and translates their position on the screen to associate them with the magnet(s) and commands.

In the exemplary embodiment, a mechanism is also provided for entering terms of query through use of a touch screen which avoids the need for a physical or soft keyboard.

The virtual magnet described herein has additional features to those described in the Ser. No. 12/480,002 application. For example, it facilitates in-depth interaction with a single document or with several documents, which are represented on the interface display. In particular, the virtual magnet can be used for simple keyword searching as well as for more advanced search and information extraction processes, such as named entity extraction and fact extraction. These processes rely on syntactic parsing of the text content of the displayed documents. For example, when exploring a document collection, the user can gradually improve his or her understanding of the documents and thereby discover new words or topics to be searched. The present virtual magnet provides the user with the opportunity to refine a query by dynamically updating the virtual magnet(s) with new text-entries. The virtual magnet enables user interaction with complex systems, such as information retrieval systems and text extraction algorithms, to be easier, intuitive and natural. The user can perform searches without the need for a keyboard.

As used herein, a "virtual magnet," or simply a "magnet" may be an icon, such as a button, which is displayed on a screen and is visible to a user. The virtual magnet is responsive to the user's touch allowing the magnet to be repositioned within the screen area. The virtual magnet has functionality similar to that of a real magnet in that it is capable eliciting a response in displayed objects in its vicinity. Here, the objects may be graphic objects, displayed on the screen. In one exemplary embodiment, the virtual magnet is capable of drawing objects towards it (or in some cases, repelling them). The objects are able to move across the screen from their original positions to a new position closer to (or further away from) the virtual magnet. In other embodiments, the response exhibited by the objects to the virtual magnet may include a change in a visible property of the graphic objects, such as a change in one or more of color, size, shape, highlighting, or combination thereof, which is readily discernible to a person viewing the TUI.

In some embodiments, the exemplary virtual magnet elicits a response by ones of the displayed objects, the response being a function of one or more attributes of the underlying items represented by the displayed objects. The objects each represent one of a set of items. In the exemplary embodiment, the items are electronic documents, such as text documents and/or digital images, although it is to be appreciated that other types of items are also contemplated, as described in greater detail below.

The exemplary displayed graphic objects represent a set of electronic text documents stored in memory. Attributes of the text documents, which cause the graphic object to respond to a magnet, in this case, can be based on the presence or absence of textual content, such as words or text strings, or the document content as a whole, such as the frequencies of keywords found in the document, cluster based attributes generated by automatically assigning the documents to one of a predetermined clusters based on similarity, or any other attribute which can be extracted, from the document or from an associated external metadata file, such as date sent, author, metadata, such as document size, document type, image content, and the like. Clustering of documents based on similarity is described for example, in U.S. Pub. Nos. 2007/0143101 (now U.S. Pat. No. 7,813,919), 2007/0239745 (now U.S. Pat. No. 7,720,848), 2008/0249999 (now U.S. Pat. No. 7,711,747), and U.S. Pub No. 2010/0088073, the disclosures of which are incorporated herein in their entireties by reference.

At least one type of virtual magnet disclosed herein is referred to as a query magnet, which is populated with a query. By "populated," it is meant that a query is associated with that magnet in memory, which can then be applied to a document or set of documents through appropriate gestures using the populated magnet. The query is based on one or more text fragments selected by a user through touch action on the touch screen device, e.g., from one or more documents displayed on the TUI. Such a magnet can be applied to a single document or a set of graphic objects representing documents for identifying responsive instances, such as responsive document content or responsive documents.

A "document," as used herein generally refers to a body of text and may be a subpart of a larger document and/or which may also include other information, such as drawings, photographs, and the like. In general, a document comprises one or more text strings expressed in a natural language, such as English or French, and having a vocabulary and a grammar. Each text string of the document can be as short as a phrase or clause of a sentence and generally comprises a sentence and may comprise two or more contiguous sentences. An input document generally includes a plurality of such text strings. Each text string may include a plurality of text elements, such as words, phrases, numbers, and dates, or combinations thereof. Exemplary text documents include word documents, spreadsheets, PDF files, scanned documents which have been OCR processed to extract text, web pages, XML files, and the like. In the case of input XML documents and web pages, the searchable text strings may include hidden text.

A "text fragment," as used herein, refers to a (generally contiguous) portion of the displayed text of a document that may be selected by a user, and can include for example, one or more text elements, a text string or plurality of strings, or even a portion of one or more text elements. For example, a user could select only a portion of a word which is of interest as a text fragment.

A "named entity," is a group of one or more words (a text element) that identifies an entity by name. For example, named entities may include persons (such as a person's given name or role), organizations (such as the name of a corporation, institution, association, government or private organization), locations (such as a country, state, town, geographic region, or the like), artifacts (such as names of consumer products, such as cars), specific dates, monetary expressions or other proper name which is typically capitalized in use to distinguish the named entity from an ordinary noun. In the case of a rule-based parser, since named entities are extracted by the application of specific rules (sometimes referred to as patterns), a named entity can be any entity which the named entity rules applied by the system are capable of extracting. Other methods for defining and extracting named entities are discussed below.

An "entity class" refers to a group of named entities of the same type, such as PERSON, ORGANIZATION, or DATE, and so forth, which is satisfied by any instance of an entity in text that is recognized by the system as being in that class. Entity classes can also be subclasses, such as COMPANY NAME and GOVERNMENT INSTITUTION.

For purposes of the exemplary embodiment, an "event" can be considered as a relationship between two entities. Each of the entities can be a named entity or an entity class, instances of which can be extracted from text through application of a syntactic parser. In some embodiments, an "event" can be considered as a relationship between a predicate and its arguments and any modifiers. See for example, Lagos, et al. "Event extraction for legal case building and reasoning," IIP 2010-6th Intl Conf. on Intelligent Information Processing, Manchester, UK, Oct. 13-16, 2010 (hereinafter, Lagos, et al.) and Capet, P., Delevallade, T., Nakamura, T., Tarsitano, C., Sandor, A. & Voyatzi, S. (2008). "A Risk Assessment System with Automatic Extraction of Event Types", IIP, Beijing, China, where an event can be considered as "a predicate (verb, adjective and predicative noun) related to its arguments and modifiers." Formally, a predicate describes a relation between two entities and the entities participating into this relation are called the arguments of the predicate. For example, in the sentence "Mary eats an apple everyday", the chunk "Mary" is the subject of the sentence and is a predicate argument. The chunk "eats an apple" is the predicate and the last chunk "everyday," because it comes at the end, is a predicate modifier. The sub-string "an apple" is designated as a "predicative noun". The verb "eats" describes the character of the event, while the two nouns "Mary" and "apple" refer to the entities which are participants in the event.

Exemplary events which can be extracted from documents using one or more magnets each include first and second entities which can be represented by X and Y respectively, where X is at least a part of the subject of a sentence and Y may form a part of a predicate of the sentence. Entities X and Y are linked by a verb V, which is part of the predicate. The relationship represented by the tuple (X, V, Y) can be extracted by grammar rules, an example of which can be generalized as:

SUBJ_N(X,V) AND OBJ_N(Y,V) AND NE(X) AND NE(Y)

i.e., X is a noun phrase comprising one or more words, which is recognized as a named entity and which is the subject of verb V and Y is a noun phrase comprising one or more words, which is also recognized as a named entity, and which is the object of verb V. NE represents a named entity or a named entity class (an abstract named entity), which in the exemplary embodiment, is specified by the user through use of the virtual magnet, as described in greater detail below. The verb V can be specified, e.g., by its infinitive form which reads on all instances of the verb, or on a more limited set of one or more tenses or specific forms of the verb. Or the verb V can read on any verb or on a preselected set of verbs. As will be appreciated, similar rules can be generated where one or both of the entities X and Y is not required to be a named entity.

As an example, consider the sentence:

ABC Corp. sued BC Corp. in U.S. District Court.

An event of type "sued" can be extracted between the two entities: ABC Corp. and BC Corp.

While in the exemplary embodiment, instances of the named entities, entity classes, and events are extracted from text using grammar rules of a parser, it is to be appreciated that other types of rule-based extraction may be implemented, such as with a) a statistical parser using dictionaries or tables of "term alignment" with observed frequencies in a reference corpus, b) a parser based on regular expression matching, c) a parser relying on Finite State Automata, d) a parser implemented through a parallel implementation strategy (no sequential matching), or a combination thereof.

The exemplary TUI provides a user with means for classifying, filtering, and/or retrieving documents and other items quickly and easily. The exemplary system can be intuitive, easy to learn, and flexible for the user. It can be easily portable, (re)configurable, and extendable to commanding many different text-extraction and search related tasks. It can also allow interaction with a multi-touch screen of the display device through dynamic magnet activation.

FIG. 1 illustrates a document review system 1 which includes an exemplary tactile user interface (TUI) 10. The TUI includes a display device 12, such as an LCD or plasma screen, computer monitor, or the like, which may be capable of displaying in color. A touch-screen 14 including multiple actuable areas which are independently responsive to touch or close proximity of an object (touch-sensitive) overlies or is integral with the screen of the display 12. The actuable areas may be pressure sensitive, heat sensitive, and/or motion sensitive. The actuable areas may form an array or invisible grid of beams across the touch-screen 14 such that touch contact within different areas of the screen may be associated with different operations. The touch-screen also displays one or more virtual magnets 16 that a user can activate through a touch action, which can be one or more finger 17 contacts with the touch-screen display device 12, or other tangible object with a relatively large touch area touching on the screen, e.g., an implement or the whole palm of the hand Exemplary touch-sensitive screen devices 10 which allow finger-touch interaction, which may be used herein, include the Multi-Touch $G^2$-Touch Screen or $G^3$-Touch Screen from PQ Labs, California (see http://multi-touch-screen.net), an infra-red grid system, such as the iTable from PQ Labs, a camera-based system, such as Microsoft Surface™ touch-screen table (http://www.microsoft.com/surface/). On this type of large touch-screen, which may have a height and/or width greater than the maximum dimension of an item (e.g., a screen measuring about 80 cm or greater on the diagonal), a large number of digital objects can be displayed and manipulated by one or more users through natural gestures. However, it is also contemplated that the display device may have a smaller screen, e.g., the size of a mobile phone screen, which may display fewer than all the graphic objects at one time (or all of them in reduced size), and provide for viewing a selected portion of one of the documents on the screen. As will be appreciated, where the finger or implement is detected by a camera rather than through pressure, "detecting a touch contact," and similar language, implies detecting a finger or other implement on or near to the screen, which need not necessarily be in physical contact with the screen.

The TUI 10 shown in FIG. 1 is configured for displaying, in addition to the virtual magnet 16, a set 18 of graphic objects 20, 21, 22, etc., to be manipulated by the virtual magnet 16. Each graphic object represents one of a collection of digital items, such as digital documents 24, 25, 26, respectively. Each graphic object 20, 21, 22 comprises an arrangement of pixels, such as an icon, a thumbnail image of the respective document, or the like. The collection 18 of documents to be searched can be represented on the touch screen display device 12 in various icon arrangements, such as tiles, clouds, icons on lines, or the like.

Some of the functions of the exemplary TUI 10, which can be implemented with the exemplary magnets 16 disclosed herein, and which are described in greater detail below, may include:

1. Enabling text entry selection in the course of a user session through the highlighting of a text fragment of a document through one or more finger contacts with the touch screen display.
2. Associating the text entry with the virtual magnet, e.g., through one or more finger or object contacts.
3. Enabling searching in one or more modes, such as:
   a) basic searching (e.g., simple keyword matching) on a document displayed on the touch screen display, or within a set of documents, by simple virtual magnet manipulations or a combination of different magnets (basic query mode); and/or
   b) advanced search (e.g., named entity or event extraction) on a document displayed on the touch screen display device (or within a set of documents) by virtual magnet manipulations or a combination of different magnets (advanced query mode).

These functions can be repeated and/or combined to conduct complex and in-depth document textual content analysis.

The virtual magnet 16 is actuable and translatable, across the display device 12 in multiple directions, e.g., in straight lines, curves, other motions, or the like in response to a finger touch or contact with the screen of another suitably sized implement, such as a cylinder or stylus. For example, the approximate number of touch sensitive elements in the area which the finger 17 or inanimate object makes contact is detected and associated with the magnet 16. In another embodiment, the touch-screen 14 includes an array of infrared emitter-collector pairs to project an invisible grid of light on the screen. When the beam is interrupted, e.g., by a finger 17 or other implement, the absence of the signal at the collector is detected and converted to an x,y touch coordinate, which is associated with the magnet.

The exemplary virtual magnet 16 includes an arrangement of colored pixels displayed on the display device screen 14 and may have various configurations which are each representative of a respective state of the magnet. In the exemplary embodiment, these include a menu mode (FIG. 3), a filtering mode (FIG. 4), a query generation mode (e.g., FIG. 5), and at least one query mode in which at least one magnet which has been populated with a query is applied to one or more documents.

One or more magnets 16 can thus be populated with a user's query. This can be achieved, in the exemplary embodiment, with finger/implement touch(es) only, i.e., without the need for keyed entry of text using a physical or virtual keyboard, keypad or the like. The user's query can be based on text selected from an opened document. A magnet 16 which has been populated with such a query is referred to herein as a query magnet. Magnets which have been activated with preset filter function(s) are referred to herein as filter magnets. In some embodiments, a magnet can be activated with both a filter function and a user's query. The exemplary query magnet 16 can be applied on the entire set of displayed graphic objects 20, 21, 22, a subset (fewer than all) of the displayed objects which have been filtered out of the document set using a magnet activated with a selected filter function, or on a single document 24, 25, or 26, or group of documents which have been opened by clicking on the respective graphic object(s). The activated query magnet 16 can operate in a similar manner to a filter magnet in that it can attract graphic objects to it in relation to the underlying documents' responsiveness to the query. On an opened document, the query magnet causes responsive instances in the text of the document to be displayed. The query magnet can be used singly or in combination with one or more other magnets to generate a combined query. For example, two query magnets 16 may be used together or a query magnet may be used in combination with a filter magnet. When two (or more) query magnets are used together on an opened document 24, the displayed responsive instances are based on a combined query of the two magnets. The exemplary magnets 16 can each be activated with filtering and/or query functions and thus can act as a query and/or filter magnet. However, it is also contemplated that magnets may be provided which can be activated with only one of these types of function. Further details on the query magnets are provided below.

The display device 12 is operatively connected with a computer device 30, such as one or more general purpose computing devices or dedicated computing device(s), such as a desktop computer, laptop computer, server computer personal digital assistant, cell phone, or other device with computing capability. In one embodiment, the computer 30 is embedded in the touch-screen device 10, behind the screen 12, e.g., as a table device. The computer 30 includes a processor 32 and a main memory 34, in communication with the processor, which stores computer program instructions for implementing the display device and touch-screen functionality as well as the virtual magnet 16 functionality. In particular, the computer memory 34 stores a display controller 36, which controls the contents of the display, and a touch detection system 38, which detects the locations of finger contacts with the touch-screen 14 and movements of the finger 17 across the screen and outputs signals in response thereto. Both of these components 36, 38 may form a part of the software supplied with the TUI 10. In addition, a virtual magnet control application 40 ("virtual magnet controller") receives signals from the touch detection system 38 and supplies control signals to the display controller 36 for controlling the virtual magnet 16, graphic objects 20, 21, 22, and related functions in response to the touch signals. In particular, the magnet controller controls the movement and state of the displayed magnet(s), movements of the virtual objects 20, 21, 22, and interactions between the magnet and the objects, based, at least in part, on attributes of documents 24, 25, 26 etc. forming a collection of corresponding electronic documents and/or other items stored in computer memory, such as temporary memory 48.

In one embodiment, the magnet controller 40 serves as a plug-in software component to the display controller 36/touch detection system 38. In other embodiments, the magnet controller 40 may be at least partly resident on a server in communication with the computer 30, and may be accessed via a wired or wireless link, such as a telephone line, or a local area network (LAN) or wide area network (WLAN), such as the Internet. For example, some actions triggered in response to magnet manipulation can be performed remotely through interactions and communication with the server, such as automatic document classification, document textual content analysis, text processing, keyword search, pattern or string matching, lookup into dictionaries or other linguistic resources, natural language processing through NLP techniques at disposal on the server side, or application of grammar rules and/or robust syntactic parsing. All these processes can also be performed on the computer 30.

An input/output interface 50 allows the computer 30 to communicate with the display device 12 and to receive touch signals from the touch-screen 14. The computer may also communicate with speakers 54, and a keyboard 56 for inputting text, and/or a cursor control device 58, such as mouse, trackball, or the like, for communicating user input information and command selections to the processor 32. However, in the exemplary embodiment, all user inputs are via the touchscreen. Another input/output interface 60, such as a modem, intranet or internet connection, USB port, disk slot, or the like, allows documents 24, 25, 26, and/or other items, and/or pre-computed attributes 62 thereof to be input to temporary memory 48, from an external source. Exemplary attributes which may be extracted from documents include presence or absence of specified keywords, document size, a class assigned to the document, e.g., stored in meta data, a function describing the similarity of the document to a predefined document or set of documents, the output of linguistic analysis and grammar rules applied to the text, a date assigned to the document, an author assigned to the document, a custodian location associated with the document, a native format associated with the document, combinations thereof, and the like.

The components 32, 34, 48, 50, 60 of the computing device 30 may communicate via a data/control bus 64. In cooperation with the display device 12, these components are configured for implementing the methods shown in FIGS. 6-8.

The operation of the virtual magnet controller 40 is best understood with reference to the methods described below. Briefly, however, the controller 40 includes software instructions executed by processor 32 which include a configuration file 66, a query generator 68 which can interact with an associated parser 70, a retrieval component 72, and a computation component 74. The query generator 68 generates a query based on a user-selected text fragment, such as a fragment of text content of one of the documents 24, 25, 26. The parser 70 is configured for parsing the text content of one or more documents. In some embodiments, the parser 70 may be configured for identifying a parser grammar rule (or rules) which a highlighted text fragment satisfies. Such grammar rule(s) can be used by the query generator 68 to generate a query which can be applied to the text of a document to identify instances of the query, e.g., an entity name or entity class, in the text. In other embodiments, the text fragment can serve as the query.

The retrieval component 72 identifies and retrieves a document 24, 25, or 26 corresponding to a selected graphic object 20, 21, or 22. The computation component 74 identifies text fragments responsive to a query within a selected document 24 and/or computes a subset of documents that are responsive to a query. Specifically, the parser 70 is configured for identifying an named entity or entity class with which the text fragment has been tagged by the syntactic parser. Such a named entity/entity class tag can be used by the query generator 68 to generate a query. Then, the computation component 74 identifies text fragments tagged with same named entity/entity class within a selected document 24 and/or computes a subset of documents that are responsive to a query, i.e., documents that contain text fragments tagged with same named entity/entity class as the named entity/entity class of the user defined text fragment.

As will be appreciated, the query can be run in combination with other parser rules, for example if the document being queried has not yet been parsed. For example, the computation component 74 may run the parser 70 on the fly on a selected document 24 and/or a subset of documents.

In another embodiment, documents are parsed in advance of a query being generated. For example, the parser 70 may be launched in batch mode when the application starts and applied up-front to all the documents available in the collection for pre-processing all texts before any user interaction with the system. This can result in all the documents having their textual content pre-tagged with class entity names (e.g., through XML-like mark-ups or other inserted tags designating the known entity class names). Afterwards, when queries involving some parsing are triggered by the user through magnet motions on one or more target documents, the computation component 74 does not have to apply the parser on the target documents, but rather can select the text fragments from the target documents that are tagged with the same entity class (or other rule) as that associated with the query. This pre-processing can also be performed through a remote server, or can be done completely outside of the application, as a pre-requisite for preparing the data with which to feed the application.

Figure 5:
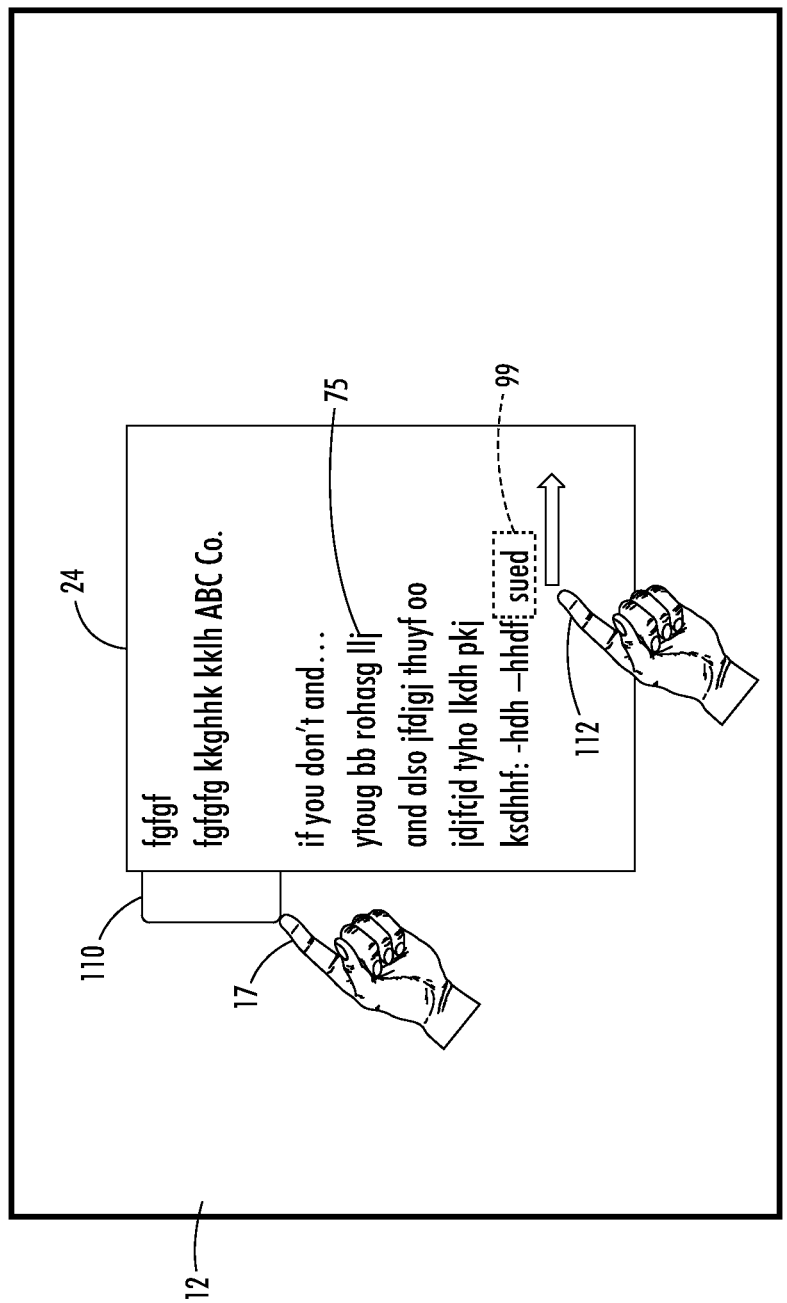
FIG. 5 illustrates a screenshot of an open document in a mode for identifying a text entry in a first method for populating a magnet with the selected text entry.

With a predefined gesture or gestures on the touch screen, the user can select one or more of the displayed objects 20, 21, 22 for review. For example, the user may double click on it to open the underlying document 24, and review its text content 75, as illustrated in FIG. 5. One or a set of retrieved documents can be processed by the user (e.g., read, viewed, classified, saved, etc.).

Figure 4:
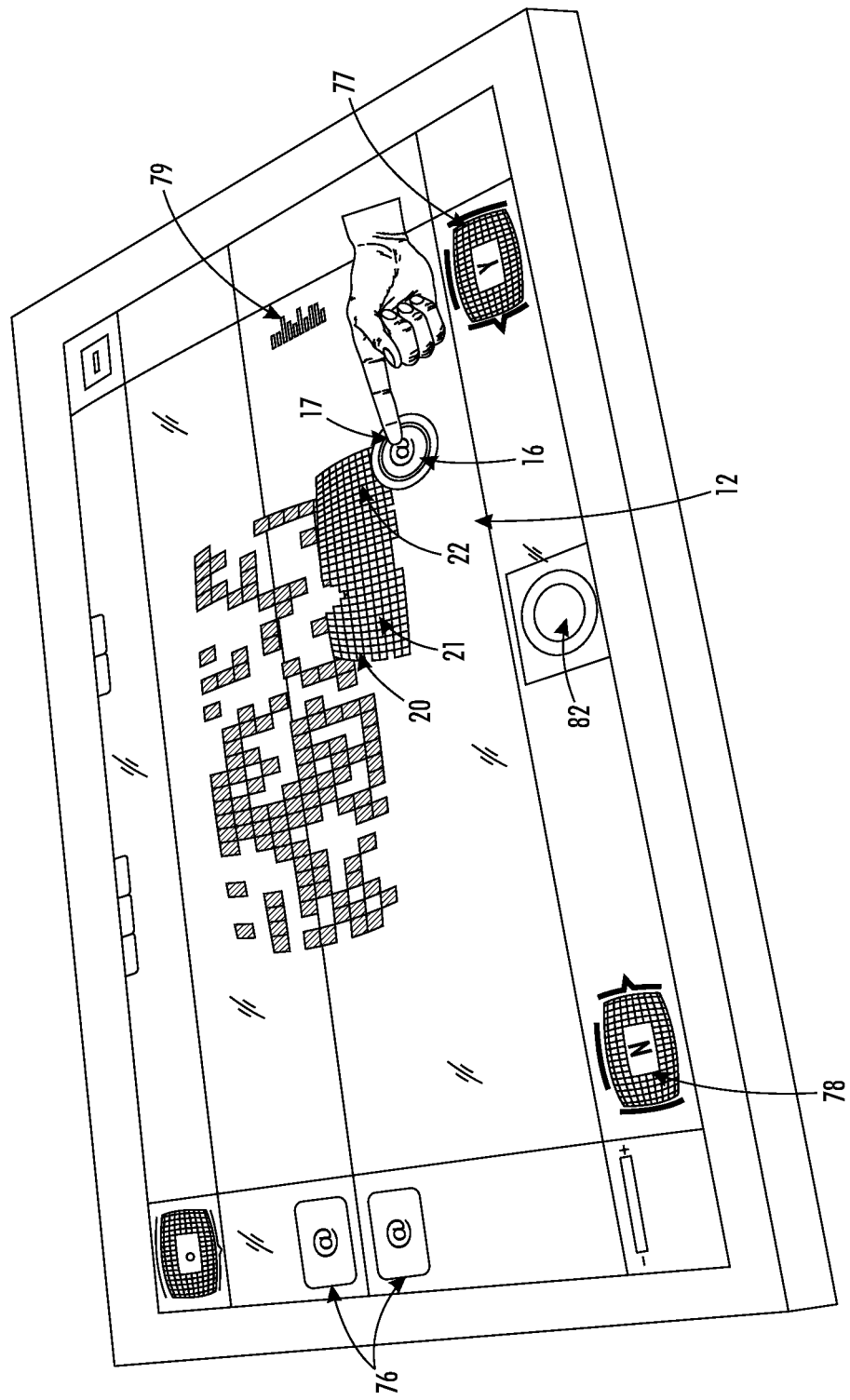
FIG. 4 illustrates a screenshot of the virtual magnet of FIG. 2 attracting graphic objects towards it in response to a filter selected through the magnet menu mode.

In addition to using a document 24 to generate a query, as described below, the user may chose to park one or more documents in a queue 76 for later review, either before or after opening the document (FIG. 4). The user may add additional documents to the queue 76 at any time, e.g., by dragging and dropping them. If the user is reviewing documents for a particular task, the user may manually classify a document 24, e.g., as responsive or non responsive, e.g., based on his review, by dragging and dropping it onto an appropriate icon 77, 78, corresponding to responsive and non-responsive, respectively. In some embodiments, a magnet can alternatively or additionally be populated with query by selection of one or more of a set of displayed query terms 79, such as a set of keywords. In the exemplary embodiment, although not shown in FIG. 5 for ease of illustration, the exemplary queue 76 icons 77, 78 and set 79 of query terms are each located in a respective region of the screen 12 (FIG. 4) and are all visible and/or accessible to the user at all times throughout the document selection query generation, and querying process.

The processor 32 may be the computer 30's CPU or one or more processing devices, such as a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used as the processor.

Computer-readable memories 34, 48, which may be combined or separate, may represent any type of computer readable medium such as random access memory (RAM), read only memory (ROM), magnetic disk or tape, optical disk, flash memory, or holographic memory. In one embodiment, the computer memory 34, 48 comprises a combination of random access memory and read only memory. In some embodiments, the processor 32 and memory 34 may be combined in a single chip.

The magnet controller 40 may be embodied in hardware, software, or a combination thereof. In the illustrated embodiment, the magnet controller 40 comprises processing instructions, stored in memory 34, which are executed by the associated processor 32. In particular, the processor 32 executes computer program instructions stored in memory 34 for implementing the method(s) described below with reference to FIGS. 6-8.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 6:
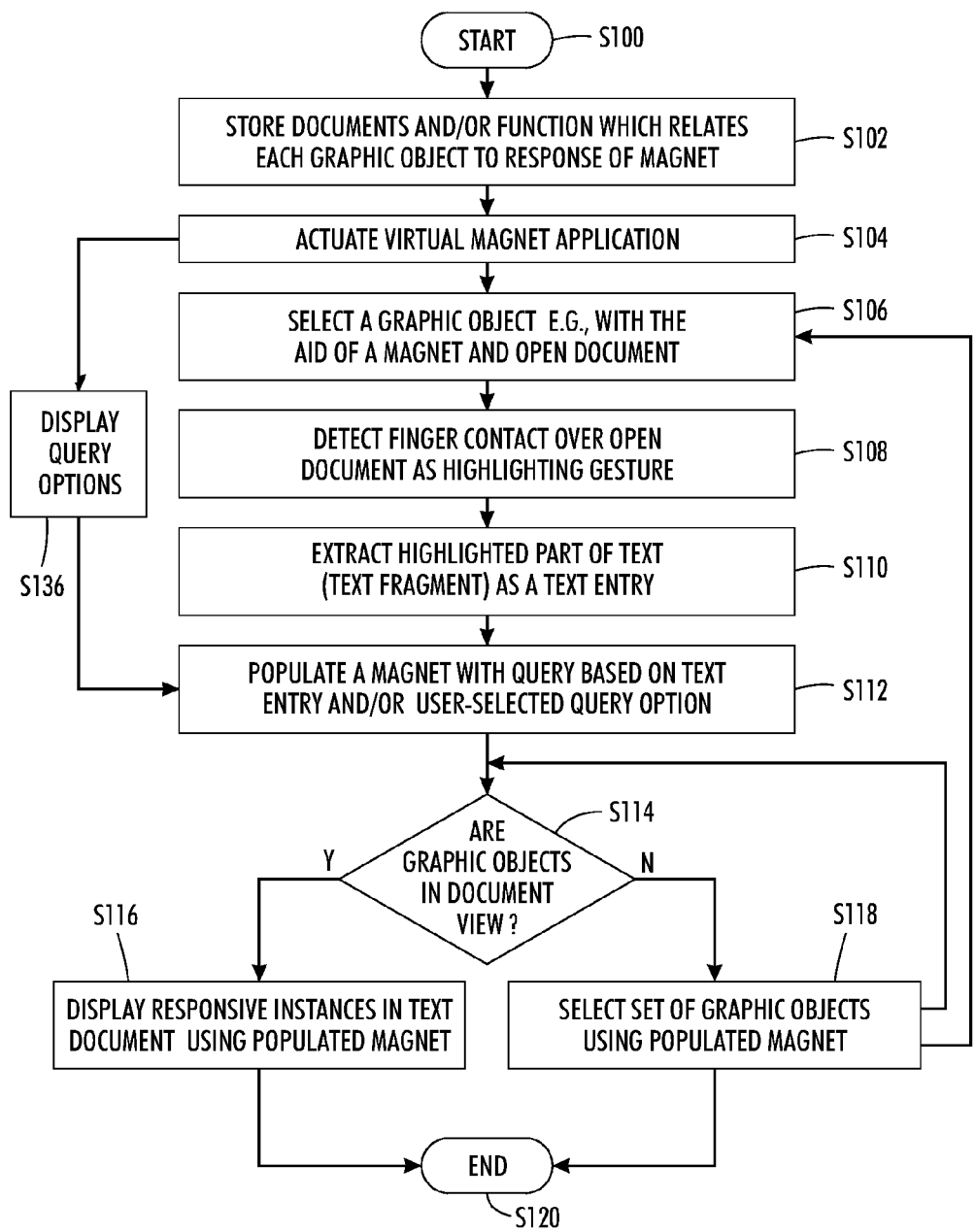
FIG. 6 illustrates steps of an exemplary method for populating a virtual magnet with a query in accordance with another aspect of the exemplary embodiment.

FIG. 6 illustrates an exemplary method for generating a query and applying the query to one or more digital documents, which may be performed with the virtual magnet 16 described herein. The method begins at S100.

At S102, items, such as text documents 24, 25, 26, are received and stored in computer memory 48. For each item, a corresponding graphic object 20, 21, 22 in a set of graphic objects is generated, linked to the respective document, and displayed. A plurality of different response functions may be stored and each associated with a respective one of a plurality of function selecting icons 84, 86, 88, 90, etc. to be displayed (see, for example, the screenshot illustrated in FIG. 3).

Figure 2:
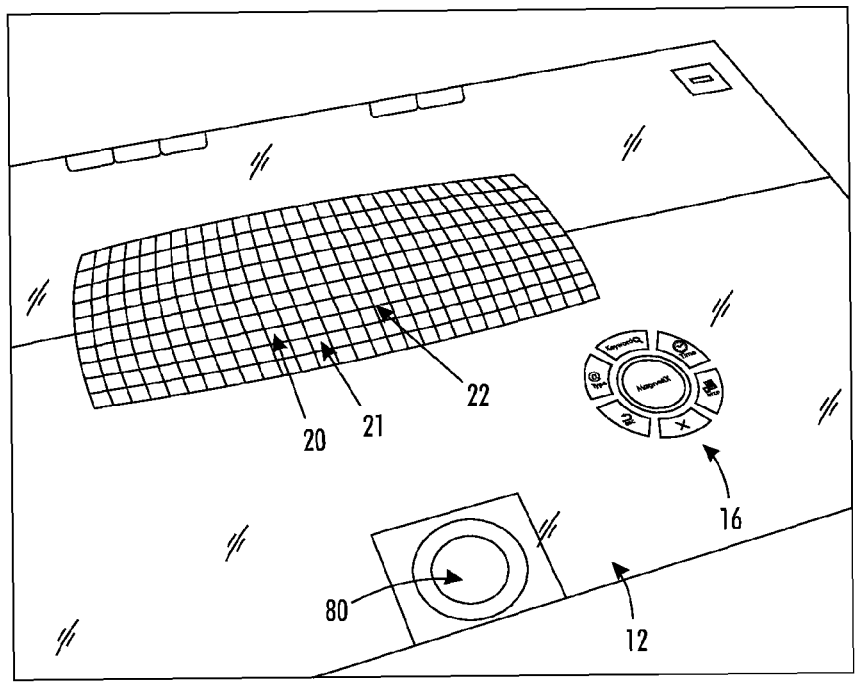
FIG. 2 illustrates a screenshot displaying graphic objects (squares) representing items, such as documents, and a virtual magnet in a menu mode.

At S104, the virtual magnet control application 40 is launched. If the current screen on the display device already displays the magnet 16, launching may be initiated by the user tapping on or otherwise touching the virtual magnet 16. Otherwise, a user may touch an icon (not shown) on the screen which causes the processor to implement the magnet's configuration file 66. Alternatively, the magnet application can be selected from a drop down menu or by other means. The graphic objects 20, 21, 22, etc. (one for each documents 24, 25, 26) are displayed on the screen 12. In one embodiment, the displaying of the objects proceeds automatically. In another embodiment, a user may chose a file using a menu, and only graphic objects corresponding to documents 24, 25, 26 in the selected file are displayed, e.g., as a two-dimensional array of blocks, as illustrated in FIG. 2. In other embodiments, the objects may be shown differently to represent some attribute of the item. For example, objects may have different colors, shapes, sizes, and/or textual content, to graphically illustrate an attribute of the underlying item (FIG. 1). In one embodiment, a clustering application (not shown) automatically clusters all of the items so that each item is assigned to one of a predetermined number of clusters, e.g., based on document similarity, as described, for example, in Privault 2010, the disclosure of which is incorporated herein in its entirety by reference. In such an embodiment, the objects 20, 21, 22 may be colored, one color for each of the clusters, or otherwise graphically differentiated. The presence of certain keywords, an assigned class, or the like in the items may also be an attribute on the basis of which the objects are initially differentiated.

At S106, a user selects a document 24 to review. This selection may be performed with the aid of a filtering magnet 16 displayed on the screen, as described in Privault 2009. Alternatively, the user may simply select one of the objects at random for review, draw one which has been previously parked in the queue 76, or otherwise select a document. A double touch, or other gesture, opens the selected graphic object 21 to display the text 95 of the underlying text document 24, as illustrated in FIG. 5.

At S108, the user reads and reviews the opened document 24 and selects a text fragment 99 (less than all) of the text document which is to be used to generate a query. As previously noted, the selected text fragment 99 may be an entire sentence or only a part of a sentence, such as a single word or two or more words in a sequence, or a string token. The user selects the text fragment with a gesture, such as with a finger movement over the text. The system 1 (e.g., query generator 68) recognizes the gesture as text selection and highlights or otherwise identifies the selected text fragment 99, e.g., with colored highlighting, a box around the text, a different font style or size, underlining, bold, movement of the text to another region of the screen, or the like. At S110, the selected fragment(s) 99 is extracted by the system 1 and stored as a text entry.

At S112, a magnet 16 is populated with a query which is based on the selected text entry. In a first, basic mode of the magnet, the query may be based directly on the selected text entry(s). In a second, advanced mode of the magnet, an entity class (or grammar rule(s)) may be identified, based on the selected text entry which is used to generate the query.

At this stage, the query may be run by the parser on all documents in the collection and documents with responsive instances may be identified, e.g., with XML tags which bound responsive instances. Or, the query may be run by the parser on only a single document or a set of documents that the user decides to review. In some embodiments, the documents in the collection may have all been parsed to identify, for example, named entities in the documents and to associate each instance with a named entity class, prior to populating the magnet.

Once the magnet has been populated, it can now be used for querying. The different retrieval functions that the magnet 16 can be associated with can include one or more of: 1) "positive" document filtering" i.e., any rule that enables documents to be filtered out, e.g., through predefined keyword-based searching rules; 2) "document similarity", e.g., any algorithm capable of identifying a degree of similarity between a predefined sample document and any other document, based on its content; and 3) "document classification," e.g., any automatic classifier through an algorithm which is able to associate a predefined label to a document, based on its textual and/or visual content.

In one embodiment, at S114, a screen mode may be detected. If the screen mode is the document view mode (as in FIG. 5), the method proceeds to S116. Otherwise, if the screen mode is the graphic object display mode (as in FIGS. 1, 2, and 4), the method proceeds to S118. It is to be appreciated that either one of these view modes can be selected by a user, for example, by clicking on an icon displayed on the screen or by clicking on a graphic object to open that document.

At S116, responsive instances in an opened text document 24 (or documents) can be caused to be displayed using the now-populated query magnet 16.

At S118, a subset of the displayed graphic objects corresponding to responsive documents can be caused to respond to the now-populated query magnet 16.

At S120 the method ends. It is to be appreciated, however, that the method can return to one of the earlier steps based on interactions of the user with the magnet, with additional magnets or with the graphic objects/displayed documents. Additionally, the user has the opportunity to populate additional magnets to expand the query, park responsive documents for later review in a document queue, and/or perform other actions as provided by the system. In one embodiment, at S122, which may occur at any time, the system 1 may display the set of predefined query terms 79 on the screen, such as keywords, allowing the magnet 16 to be populated at S112 with a query which is based on a selected one or more of the displayed keywords 79, either alone or in combination with a text entry selected by the user from a document(s).

Figure 7:
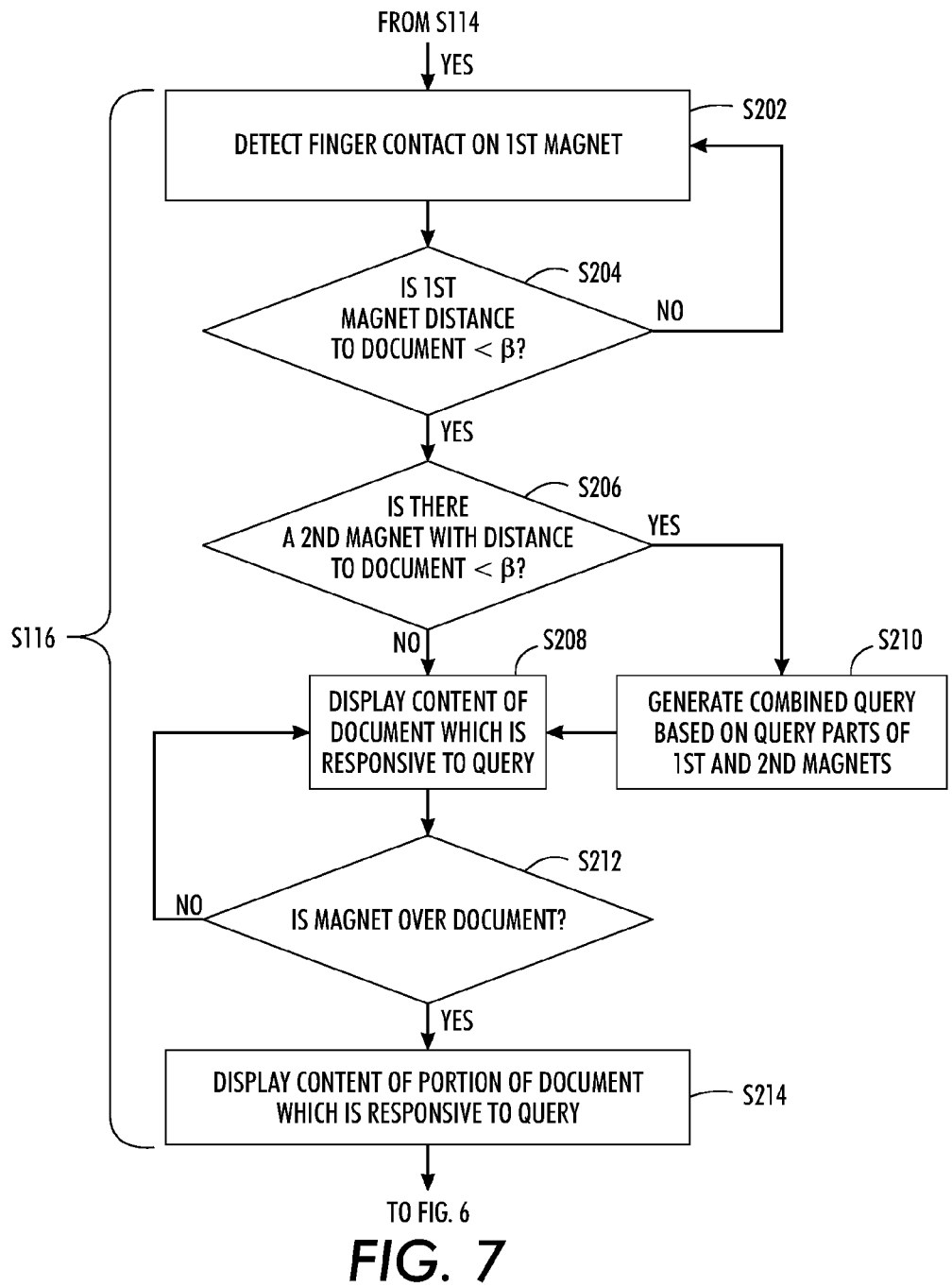
FIG. 7 illustrates steps of an exemplary method for using a magnet in query mode on a single document in the method of FIG. 6 in accordance with one aspect of the exemplary embodiment.

With reference now to FIG. 7, querying of a displayed document (S116) may proceed as follows. Since a document is already open, the populated query magnet 16 displayed on the screen is interpreted as being in a "text select" mode and can be moved, e.g., by finger contact (S202), to a position close to a displayed document, which can be the same document 24 which was used to generate the query or a different document 25, 26. The query 100 can be visualized, e.g., displayed on top of the magnet 16.

At S204, the system 1 detects whether the magnet is within a predetermined distance from the document. If there are additional magnets close to the document the system detects these also (S206). At S208, text content 102, of the displayed document which is responsive to the magnet's query is identified and displayed to the user, e.g., with any suitable method, such as highlighting (as for text 99) or otherwise displaying the responsive instances 102. The responsive text content 102 may be a text string, such as a word, sequence of words, sentence, paragraph, or the like. The identified text content 102 may include word(s) which are spaced by other text, for example, two or more text strings which, separately or in combination, are responsive to the query may be displayed. If more than one magnet is detected within the threshold distance, at S210, a combined query is generated from respective queries (query parts) of the two magnets and responsive text content 102 is displayed, as for S208.

In one embodiment, at S212, if the magnet(s) is/are on top of the document (for example, the user uses a finger touch to place the magnet over a selected document region), the method proceeds to S214, where the displayed text content 102 is limited to text content which is in a region of the displayed document that is close to the magnet such as that which is in the same line or same part of the page as the magnet, and text content 102 in a second region more remote from the magnet is not displayed.

At S118, if the screen view is the graphic object display mode, finger contact on the magnet is detected and interpreted as being a "document select" mode. In some embodiments, the displayed graphic objects 20, 21, 22 differ in their response to the populated query magnet 16, allowing one or more displayed objects to be separated from other objects. In one exemplary embodiment, the objects translate towards the magnet as a function of the attribute (or attributes) of the underlying item and otherwise remain stationary if a predetermined threshold of the function is not met. In other embodiments, a repulsive force could also be simulated, causing some objects to move away from the virtual magnet as a function of their attributes. In yet further embodiments, the objects arrange themselves at varying distances from the virtual magnet as a function of the item's attributes.

For example, the system 1 detects whether the populated magnet 16 is within a predetermined distance from one or more of the displayed graphic object(s). If so, any of these graphic objects whose underlying documents include text content 102 which is responsive to the query 100 are identified and move in response to the query towards the magnet. The user may open the document, as for S106. The method can then proceed to S116 where the user may decide to view a document or documents, and annotate it/them with tags, such as HTML tags, highlight text portions of interest, manually classify the item, place the item in a particular file, or perform any other appropriate action on the item. Or, the method may continue to S108 for generating a new/updated query magnet.

As will be appreciated, while FIGS. 6 and 7 illustrate an exemplary sequence of steps, additional or alternative gestures may be recognized by the system 1, allowing the user to navigate and/or query the documents differently.

Figure 8:
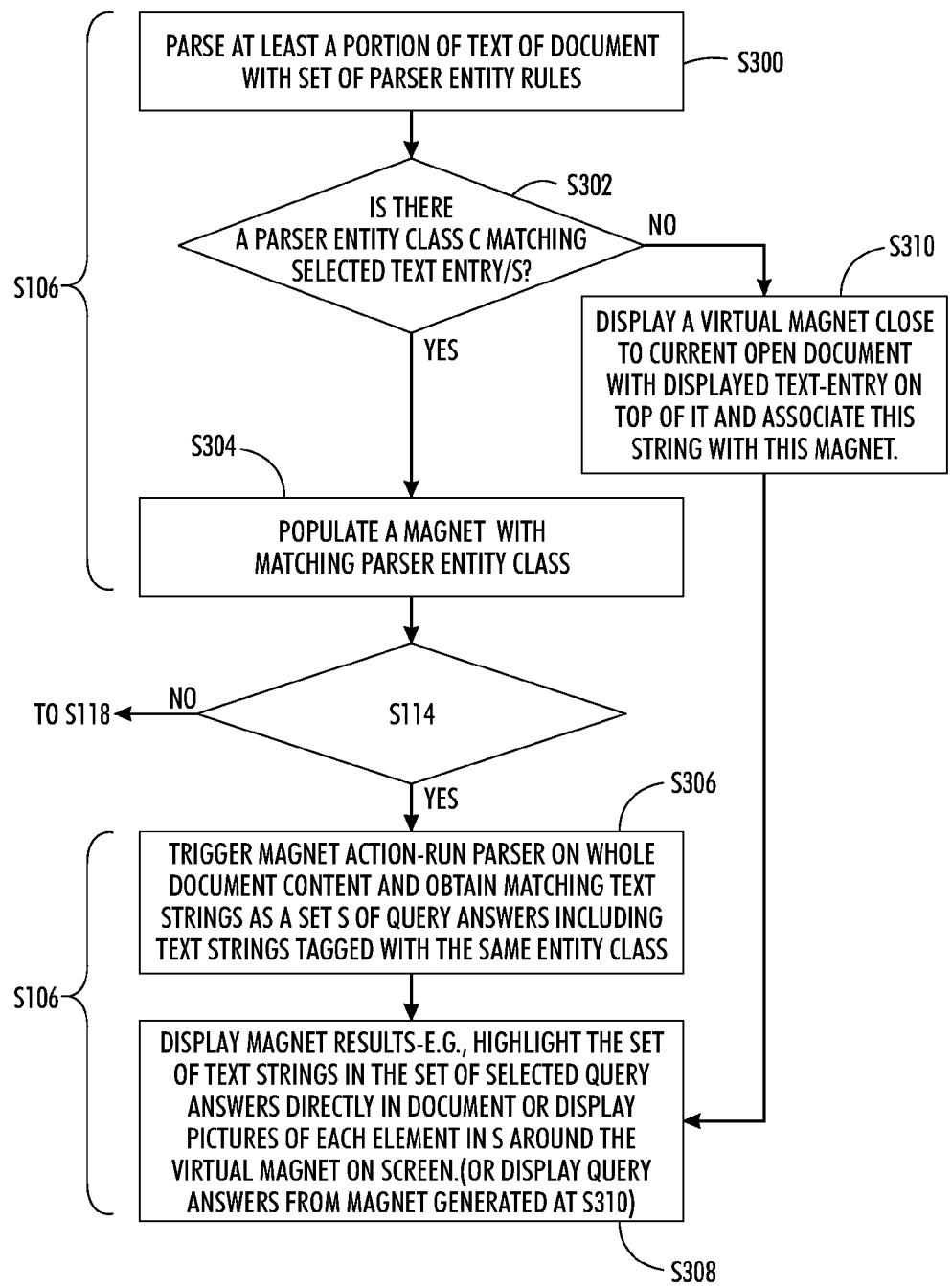
FIG. 8 illustrates a method for populating a magnet with a query based on a text entry in an advanced mode of operation of the virtual magnet.

With reference now to FIG. 8, in one embodiment, an advanced mode of the magnet may be implemented at S112. This may be selected by a user with an appropriate gesture, such as a finger movement, tapping on the magnet or the like. The method may include the following substeps: At S300, text content 95 of document 24 is parsed with the parser 70 to annotate the text with tags which assign morphological information to the words in the text and identify relations between text elements by application of a set of grammar rules. The parsing of the document text may proceed at an early stage, e.g., when documents 24, 25, 26 are retrieved into memory. Or it may be performed later, when a user selects to use the advanced mode, in which case, the parser 70 need only parse the displayed document 24, or only a portion thereof which is close to a magnet 16. The parsing includes extraction of named entities belonging to class C and relations between the named entities and other text elements.

At S302, the system 1 checks to see if there is a parser entity class C which matches the highlighted text entry. Each parser entity class C may be associated with one or more grammar rules which are to be satisfied in order for a text fragment to be regarded as matching that class. One type of magnet matching function (or entity rule) is a matching function which identifies a class of named entities corresponding to at least one of the highlighted words in the highlighted text fragment. Another type of magnet matching function which can be generated using the magnet is a matching function which identifies an event in which the named entity class C serves as entity X and/or Y. Further details on the method for generating an event type query are described below.

If a matching entity class is found, at S304, a query magnet 16 is populated with a query for implementing class detection, Various methods for populating the magnet with the query are described below, which include manual and automatic methods. The virtual magnet 16 shows a representation of the entity class name on top of it (e.g., "DATE"), and a class C is associated with that magnet.

The method may then proceed, for example, to S116, where finger contact on the magnet actuates the magnet in the advanced mode. When the magnet is close to a document, the parser is applied to the entire document to identify text fragments which the parser identifies as matching the entity class C (S306). This may include applying the parser for full syntactic parsing of the document to identify all detected named entities and then filtering out only those text fragments that match the target entity class C. These matching text fragments, or larger text strings which include them, may become query answers 102 which are displayed, e.g., in the document or around the magnet (S308). As will be appreciated, the method can alternatively or additionally proceed to S212, where only query answers close to the magnet are displayed.

If at S302, there is no stored parser entity class C matching the highlighted text fragment, then at S310, the method treats the highlighted text fragment as a basic query and generates a virtual query magnet using the highlighted text fragment to form the query. For example, if the system 1 is not able to associate a parser entity class DATE with a text fragment "November $16^{th}$", the query may simply be the text fragment "November $16^{th}$." There is thus no query extension in this case, but simply exact string matching.

The method illustrated in FIGS. 6, 7, and/or 8 may be implemented in a computer program product or products that may be executed on a computer. The computer program product may be a non-transitory computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. Alternatively, the method may be implemented in a transitory medium, such as a transmittable carrier wave, in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart(s) shown in FIGS. 6-8, can be used to implement the method.

Further details of the system and method will now be described.

Document Selection (S106)

Figure 3:
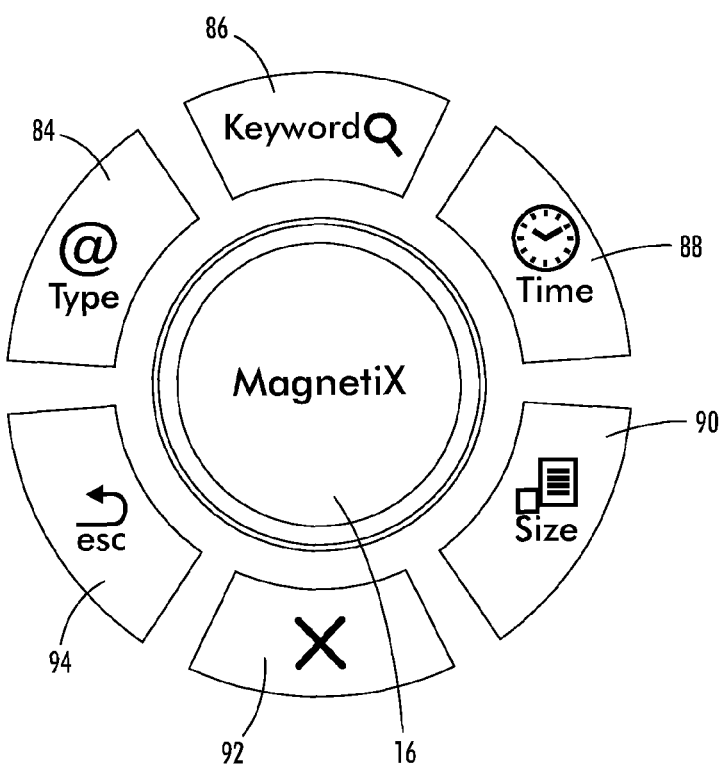
FIG. 3 is an enlarged view of the virtual magnet of FIG. 2 in a menu mode.

In one embodiment, the magnet 16 may be used for document filtering, as described in Privault 2009. For example, the user can select a magnet, e.g., one which is in a home (inactive position) 80 and, with a dedicated touch action (e.g., double tapping on the magnet), set the magnet button 16 in a menu mode (FIG. 3), and several options appear around the magnet, such as query criteria. For example, as illustrated in FIG. 3, the user can select one (or more) of a set of response functions 84, 86, 88, 90 associated with the magnet 16, by touching one of the respective areas around the magnet. Each response function defines how each of the set of displayed objects 20, 21, 22 will respond to the virtual magnet 16 based on one or more of the underlying document's attributes. The exemplary response functions include a TYPE function 84, a KEYWORD function 86, a TIME function 88, and a SIZE function 90. Clicking on one of these functions with a finger touch opens a submenu which allows a selection to be made between a set of filters. The magnet can be activated with one of these filters to select a set of the displayed graphic objects, based on the response of the underlying documents to the selected filter. For example, clicking on the TYPE function 84 allows a user to select a type of document, such as one of emails, word documents, scanned documents and spreadsheets. The KEYWORD function 86 allows a user to select from a predetermined set of keywords, which may have been selected as being ones which are particularly relevant to the document review. The TIME function 88 allows a user to select from a set of date ranges which can be used to filter out documents which have date stamps within the selected date range. The SIZE function 90 allows a user to filter documents by size, such as small, medium, large, and very large. These predetermined functions, of course, are only exemplary. The user can cancel the selection (close the menu) or escape to a higher level menu by clicking on the appropriate buttons 92, 94. When a particular filter function is selected, a representation of the selected filter function is displayed on the magnet. For example, as shown in FIG. 1, the user has selected the email filter using the TYPE function 84, and the character @ is displayed on the magnet to represent this function. When the user selects the email function, objects whose underlying documents are recognized as emails are attracted by the virtual magnet button 16 and move from their original place on the touch-screen display device 12 to a position that is closer to the magnet 16, as illustrated in FIG. 4, or exhibit another visible response to the magnet. As will be appreciated, other methods for manipulation/selection of a document(s) are also contemplated.

In response to a selection of one of the displayed objects (e.g., a double tap on the respective object 20), the corresponding item, such as a text document 24 may be retrieved (e.g., by the retrieval component 72 of the magnet controller, FIG. 1) and displayed on the screen (FIG. 5). While the user may chose to review one(s) of the documents corresponding to the objects in the subset responding to the magnet 16, in other instances, the user may select to review items corresponding to the remaining objects. If a user selects more than one object to review, this information may be sent to a document distiller, which places the objects in queue 76 and causes the selected documents to be opened one by one.

Two ways of population of a magnet (S112) with a query through text selection (S110) in textual documents will now be described in greater detail.

1. Dynamic Update for Basic Search

By way of example, in a document review for a legal matter, a reviewer may be given a set of documents (e.g., about 500 documents) to review in a day and is requested to sort them out into sets of documents which are relevant and non-relevant to the case, respectively. The basics of the case may be pre-specified in a review protocol and implemented through one or more predefined filters via filter magnet 16. However, after having read several documents, the user may have discovered some new vocabulary, terms or sentences in connection with the kind of information that he or she is looking for (i.e., which are considered relevant to the case). The reviewer would like, at this point, to be able to find some other documents having a similar content.

Given a document 24 in which the user has found relevant content which she would like to make use of, the user can highlight, directly on the screen, a fragment 99 of the text which is of interest, through finger selection (FIG. 5). To distinguish this touch action from a document moving action, a fixed document tab 110 may be displayed on the screen, e.g., on the border of the document 24. The user is instructed to first touch the tab 110 with one hand 17, while moving finger(s) 112 from the other hand over the document image to select the desired fragment 99 of text, which may be highlighted to indicate the selection. The system 1 recognizes the dual touch as a gesture which is associated with text selection.

Figure 9:
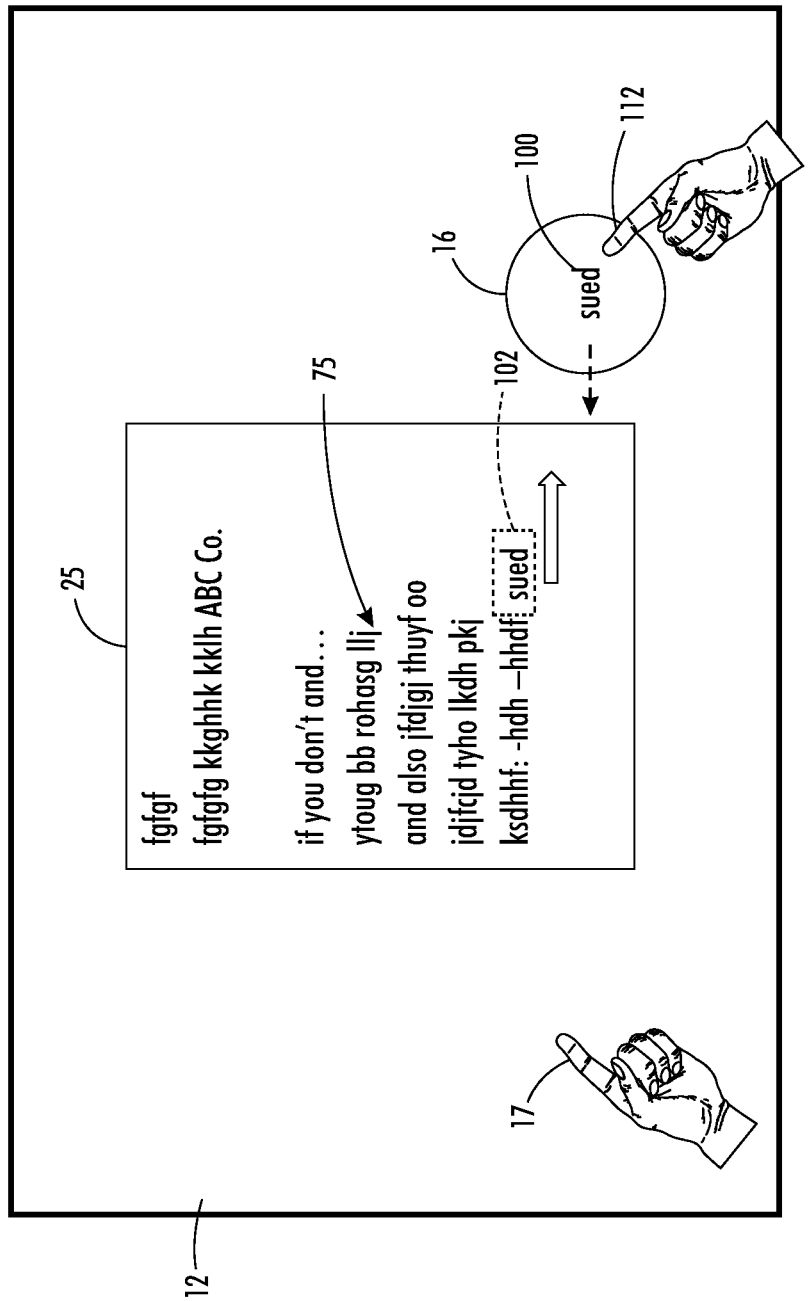
FIG. 9 is a screenshot illustrating applying a magnet populated with the selected text entry to a document.

The text selection can trigger the automatic display of a virtual magnet 16, e.g., the magnet automatically appears close to the document page 24 (FIG. 9). The text highlighting thus automatically invokes the magnet display and its appropriate setting with the data extracted from the document. Specifically, the displayed magnet absorbs the user selection (here, the text "sued" extracted from the document). The selected text entry 100 is displayed on the magnet 16, for convenience of the user.

Figure 10:
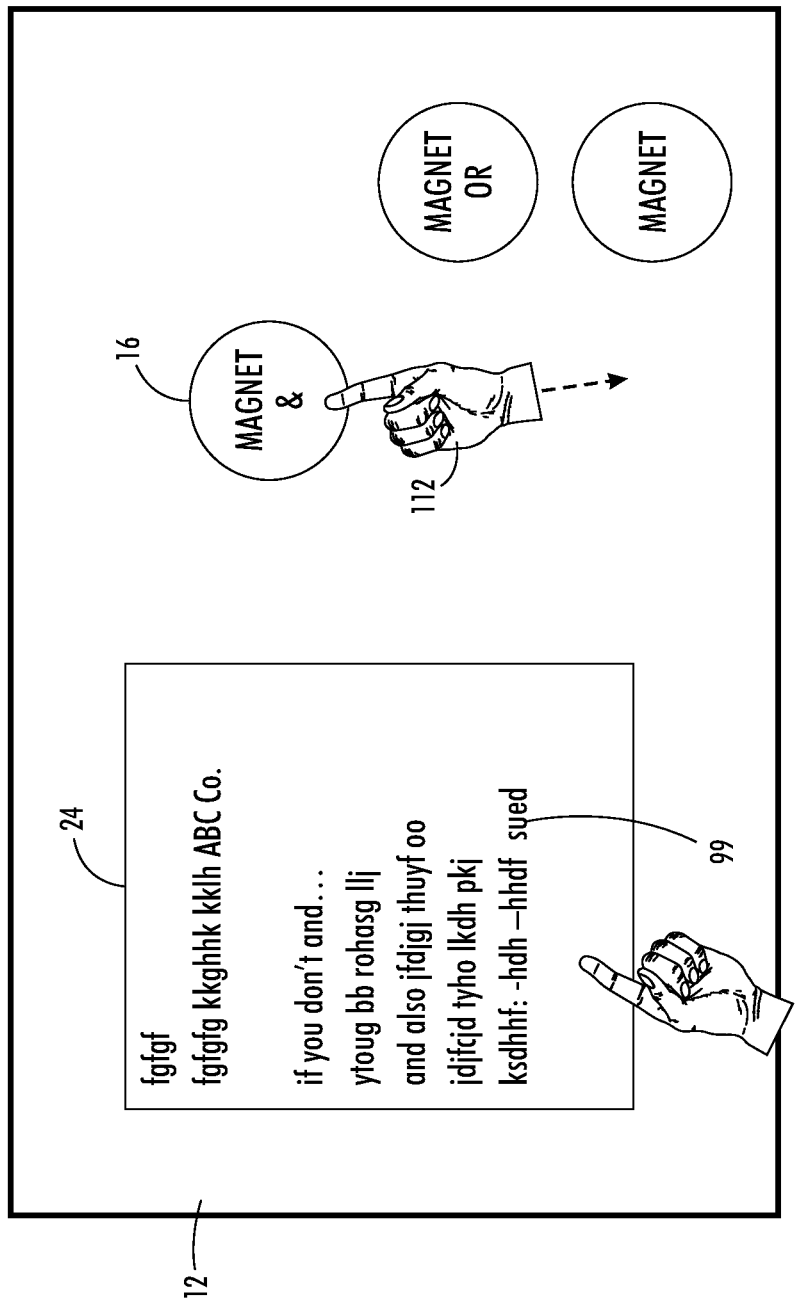
FIG. 10 is a screenshot illustrating a second method for populating a magnet with the selected text entry.
Figure 11:
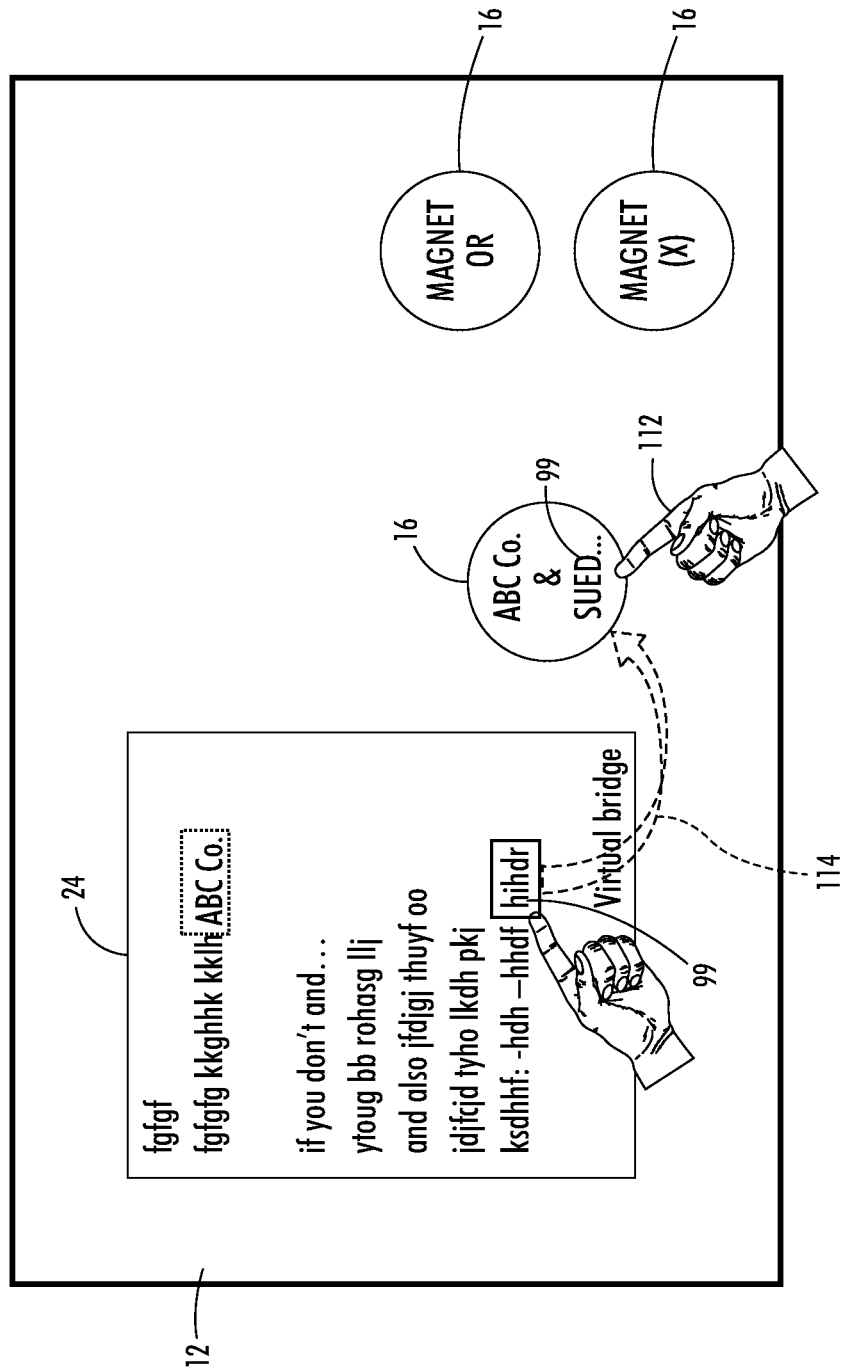
FIG. 11 is a screenshot illustrating a third method for populating a magnet with the selected text entry.

In another embodiment, the user chooses a magnet 16 already displayed on the side of the screen (FIG. 10). The user drags it close to the document object 24 currently opened on the display device 12 using a finger 112. The user further selects the desired portion of text (FIG. 11). For example, the user touches the text 75 with one finger 17 of one hand and drags it across the desired portion of text, which is highlighted (in some embodiments, the user may first select the highlighting mode with tab 110, as illustrated in FIG. 9). The magnet 16 is then fed with the text selection 99 through an appropriate dual touch-touch gesture. For example, the user keeps or places the finger 17 on the highlighted fragment 99 (a static contact). Then, the user contacts finger 112 of the other hand on the magnet 16 with a suitable gesture, such as a single or double tap (a dynamic contact). In this way, the text fragment 99 and magnet 16 are touched sequentially and also simultaneously (at least for a brief moment), with respective fingers. This dual touch is referred to herein as a virtual bridge gesture. It creates a virtual bridge 114 between the document text fragment 99 and the magnet 16. The magnet 16 is then activated with the user's text selection 99 or a query based thereon.

The virtual bridge 114 can also be used for other transfers. In general, it is a two-stage gesture where first one or several static contacts from one hand 17 are made onto a source artifact (the selected fragment 99 of text in this case) and second, one or several dynamic contacts from the other hand 112 are made onto a destination artifact (the destination magnet 16 in this case). This results in information 99 from the source artifact 24 being transmitted to the destination artifact, the magnet 16 in the present case, or a source artifact being moved to a destination artifact (for example, in moving a document 24 to the response pile 77 or 78).

As will be appreciated, the system 1 does not discriminate between the two hands of the user. Indeed, an expert user may find it possible to use one finger 17 of one hand for touching the magnet and another finger 112 of the same hand for highlighting the text.

In yet another embodiment, the user highlights the relevant text 99 then chooses an inactive magnet 16 from among those already displayed on the side of the screen. Then, she drags magnet 16 close to the document object 24 currently opened on the screen. The magnet then automatically 'attracts' the selected text 99.

Where the text contains more than one keyword that the user would like to absorb into a query represented by the magnet, the user can choose between magnets which respectively implement 'AND' and 'OR' operators, as illustrated in FIGS. 10 and 11, or by actuating the AND (&) or OR operator on a magnet using a menu on the magnet. The magnet is activated with the user text selections combined with the selected operator. For example, the user may select the text "ABC Co." using any of the methods described above. The user selects the text "sued" which, in combination with an AND operator, creates a query "ABC Co. AND sued." The two elements to be combined can be extracted from the same document 24 or from different documents 24, 25, 26. As will be appreciated, any number of elements may be incorporated into the query in this way. However, in other embodiments, a user may find it useful to create two magnets, one with "ABC Co." and the other with "sued" and use them in combination to find instances of the combination in one or more documents.

The query may be implemented in any suitable software. In particular, the query generator 68 includes instructions for extracting the text fragment 99 from the user selected highlighted portion of the document 24, 25, or 26 stored in memory, storing the extracted text fragment 99 in computer memory 48, forming a query from the extracted portion. In the case of a basic search, the generated query can simply be "find all X", where X is identical to the highlighted portion 99. The query generator associates this query in memory with a reference to specific magnet which is being "updated" with the query. For example, the information may be stored as (Magnet ID, Query ID), where the IDs identify the magnet and the query respectively.

In the case of a Boolean query, such as an AND or OR query, the query may be structured so as to only identify instances which co-occur in the same sentence or in the same paragraph. Where the query "ABC Co. AND sued" is limited to responses in a single sentence, the system may identify as responsive "ABC Co. and BC Co. sued DE Inc. today" and "DE Co. was sued by ABC Co." but not "ABC Co. sells ink. It sued DE Co. today." In other embodiments, the parser 70 may implement a coreference module which is capable of identifying that "It" refers to "ABC Co." and thus identify the sentence containing "It sued" (see the description of the advanced query mode below).

Using one or more of the above methods, a query magnet 16 is thus ready to be used. As will be appreciated, several new magnets can be created sequentially in this way. Through a natural motion gesture, the user can move the query magnet 16 or a set of query magnets close to a set of graphic objects representing documents displayed on the table and responsive objects 20, 21, 22 (e.g., those for which the underlying documents contain the same content as the selected fragment(s) 99 of text) are identified and attracted around the magnet 16 in S118 in the same manner as shown in FIG. 4. This allows searching a document collection based on a query generated from selected text fragments of one or more displayed documents.

Figure 12:
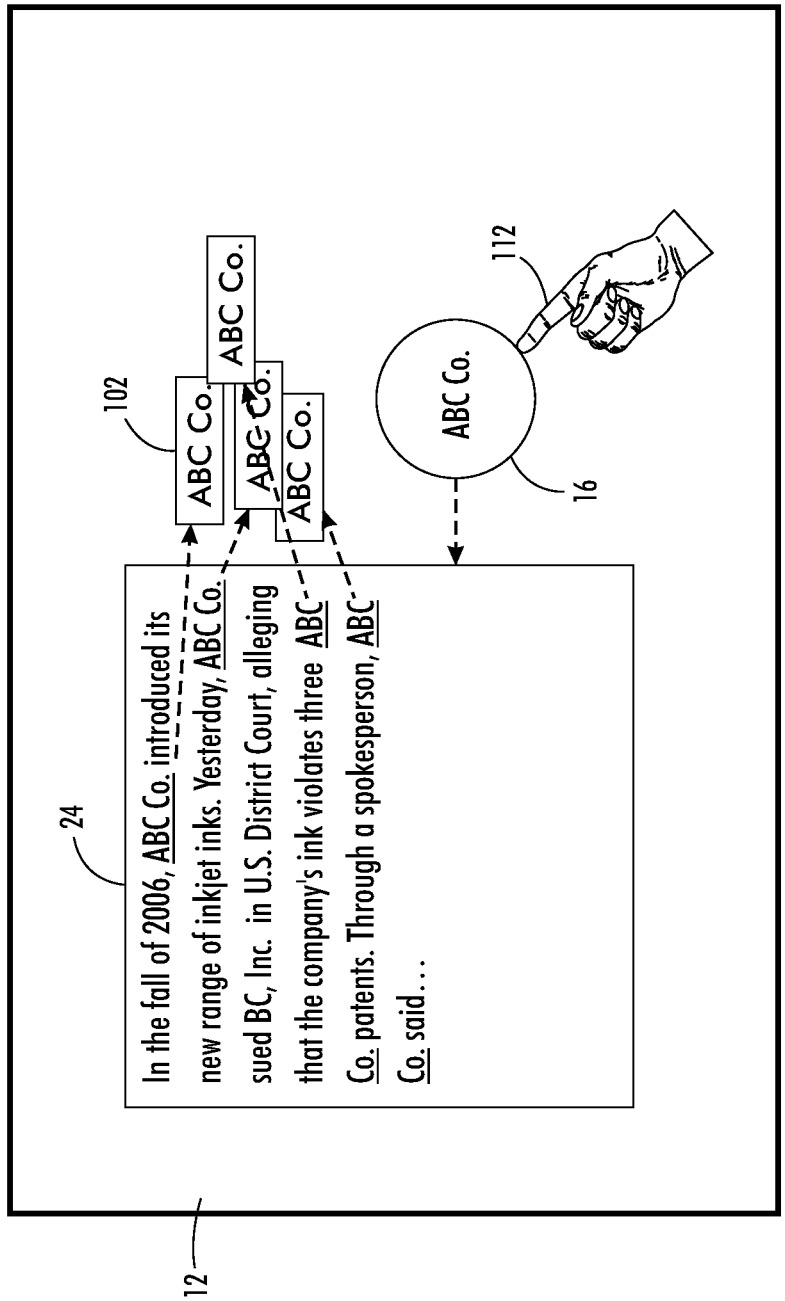
FIG. 12 is a screenshot illustrating display of text strings responsive to an active magnet in one embodiment.

In another embodiment (S116), the query magnet(s) can interact with a single document (see, e.g., FIGS. 9 and 12). The document 24 can be the same document as the one from which the text entry 99 originates, or a newly opened one. In this embodiment, moving the query magnet 16 close to the document 24 now serves to identify all the matching text strings 102 from the document. These matching text strings may be highlighted in the document and/or may be extracted from the document and displayed elsewhere. For example, the strings 102 are attracted around the query magnet 16, as shown in FIG. 12. With this visual effect, the user can see at a glance the quantity of matches found within the document 24, without having to walk through it. If the quantity is small or zero, the user may decide to skip that document and move to another one with the query magnet 16. On the contrary, if the quantity is visually significant, the reviewer may decide to read the document 24 and/or tag it as responsive to the case.

In some embodiments, moving the query magnet 16 over the document illuminates all of the matching text strings 102 within the document. The query magnet 16 may also operate on only a portion of the document. For example, whenever the magnet is placed over a top portion of the document, it illuminates only the matching text strings 102 that are in the top portion of the document and similarly, whenever the magnet is placed over the bottom portion of the document, it illuminates only the matching text strings 102 that are on the bottom portion of the document. Alternatively, only the matching strings nearby the magnet are illuminated while the user is sweeping the document image with the magnet by moving it over the document.

In both cases, namely term attraction and term highlighting, the user can further combine several magnets associated with different text fragments 99, each of which may be provided as text-entries through manual highlighting. More complex queries can be operated in this way. The set of different magnets can be moved together close to the document, or placed on top of the document image.

2. Dynamic Update for Advanced Search

In the above examples of methods for dynamic text search, the magnet 16 is used in a "basic" mode simply for identifying perfectly-matching text strings in documents. Thus, for example, the query "ABC Co." only identifies matching text strings that are identical and does not identify a text string, for example, that only includes "ABC." Nor does it identify other company names in the text of a document. In other embodiments, the user query can be extended and enriched automatically, using a predefined set of instructions stored in memory. The exemplary virtual magnets can thus advantageously combine algorithms as well as data. In this way, more advanced searches can be conducted through the magnets which are based on the user-selected text strings, but which still can be generated without resort to a key entry device.

In exemplary embodiment, the magnet is used for named entity and/or for event extraction from texts. These extraction methods are useful for a variety of applications, such as for legal case building and reasoning, as well as in document review. See, for example, the scenarios described in Lagos, et al.

The exemplary parser 70 is configured processing the text of a document 24, 25, 26, or a portion thereof, to identify its base constituent parts, typically including words and punctuation. Each word, punctuation mark, or text element is referred to as a token. An attempt is then made to associate each text element token with lexical information using a morphological analyzer (this may be performed with a finite-state lexicon that is an automaton which takes as input a text token and yields all possible morphological interpretations of the syntactic nature of that token). The words in the lexicon are indexed according to their part of speech and other morpho-syntactic information. For example, nouns, verbs, adverbs, etc. are first extracted and groups of linked words, such as noun phrases, verb phrases are identified. Syntactic analysis then identifies relationships (dependencies, such as subject-object dependencies) between text elements (words or groups of words).

Given a selected fragment of text 99 from the document, the exemplary parser is able to identify named entities within the selected text. In the present system, the parser 70 is capable of identifying named entities and events in documents.

In some embodiments, the exemplary parser 70 is able to identify a grammar rule or rules based on the selected text 99. In general, a rule (or set of rules) may be generated for which the selected text 99, alone or in combination with other text elements, satisfies the rule(s). The parser 70 may, for example, identify named entities and events in documents through application of specific grammar rules that are generated/identified based on the extracted text fragments.

For example, the parser 70 identifies all named entities in the selected fragment 99. The identified named entity (or named entities) can then be associated with a virtual magnet 16 by the query generator, to be used in a grammar rule for identifying other instances of the same named entity within a parsed document or for identifying documents containing such instances. These instances can be tagged, e.g., with XML tags, so that they are readily identified when the magnet is applied. In other embodiments, by instantiation of a specific entity class-based rule, the magnet 16 can be configured for identifying named entities within the same class C or for identifying events including the named entity/entity class C.

The parser 70 used for detecting entity classes can be based on different methods and algorithms than those described herein, such as through statistical analysis, finite state automata, and the like. The syntactic parser can perform the extraction of entities using contextual local grammar rules alone, or using pre-compiled lists of entities (e.g., a list of person names, places, etc.), in combination with contextual local grammar rules.

A pronominal coreference module may be used by or incorporated in the parser to identify references to an entity which allows a pronoun to be resolved from surrounding text. In some embodiments, a lemmatizer may be used by or incorporated in the parser to identify a normalized form of a verb or noun, for example, so that all instances of the normalized form (or at least a predetermined set of instances) in the text can be recognized. For example, the normalized form of a noun may be the singular form and the normalized form of a verb may be the infinitive. Thus, for example, a query "ABC Co. & sue*," may be generated where the user has highlighted "ABC Co." and "sued," sue* being used as the normalized form of the verb sued). Such a query may identify a text fragment "ABC Co. sues."

An exemplary syntactic parser 70 which may be employed is the Xerox Incremental Parser (XIP). For details of such a parser, see, for example, U.S. Pat. No. 7,058,567 to Aït-Mokhtar, et al.; Aït-Mokhtar, S., Chanod, J.-P. and Roux, C. "Robustness beyond shallowness: incremental deep parsing," in Natural Language Engineering, 8(3), Cambridge University Press, pp. 121-144 (2002); Aït-Mokhtar, et al., "Incremental Finite-State Parsing," Proceedings of Applied Natural Language Processing, Washington, April 1997; and Aït-Mokhtar, et al., "Subject and Object Dependency Extraction Using Finite-State Transducers," Proceedings ACL'97 Workshop on Information Extraction and the Building of Lexical Semantic Resources for NLP Applications, Madrid, July 1997. The syntactic analysis may include the construction of a set of syntactic relations (dependencies) from an input text by application of a set of parser rules. Exemplary methods are developed from dependency grammars, as described, for example, in Mel'cŭk I., "Dependency Syntax," State University of New York, Albany (1988) and in Tesnière L., "Elements de Syntaxe Structurale" (1959) Klincksiek Eds. (Corrected edition, Paris 1969).

The syntactic relations output by the parser (both binary and more generally n-ary relations), link lexical units of the input text and/or more complex syntactic domains that are constructed during the processing. These are mainly chunks, as described, for example in Abney S., "Parsing by Chunks," in Principle-based Parsing (Robert Berwick, Steven Abney and Carol Teny, Eds., Kluwer Academics Publishers 1991). The syntactic relations are labeled, when possible, with deep syntactic functions. More precisely, a predicate (verbal or nominal) is linked with what may be referred to as its deep subject (SUBJ-N), its deep object (OBJ-N), and modifiers. As will be appreciated, the XIP parser, as discussed herein, is intended to be exemplary only. Different parsers with different levels and types of parsing rules can be used in place of the XIP parser.

The parser includes or accesses a named entity recognition component (NER) 120 and an event recognition component (ER) 122. NER 120 processes the document text 95 to identify named entities in text strings, such as sentences, which together form the document. The NER can be any suitable system which tags the identified named entities or otherwise annotates the text according to their context (e.g., PERSON, LOCATION, ORGANIZATION, DATES, etc.).

In some embodiments, each of these types of named entity may be associated with one or more predefined matching grammar rules for identifying instances in text. For example, the rule may specify that instances of a named entity class include all of the text elements which are labeled with a particular class in a given lexicon. For example, in the case of LOCATION, they may include spatial, geographical, and physical locations, including planets, such as Earth, Mars, Jupiter, etc.; continents, such as Europe, North America, countries, such as England, France, etc., regions, states, or provinces, such as Ohio or Loire Valley, towns and cities, such as London, Paris, etc., or local districts, such as $14^{th}$ Arrondissement or Soho; or more specific locations, such as The White House, or Chateau de Versailles. In the case of the class DATE, named entities may include one or more of month, day of the month, year, day of the week, name of the day, and time of day. Example DATE instances may include: $19^{th}$ Century; 2009; April 1st; Friday 13th; Jan. 1, 2000; August 2008; New Year's Eve, and the like.

Events extracted can be of the type "X acquires Y" or "X emails Y", and can be abstracted as classes of events, including cognitive, interaction, reference, and role-based events.

In addition co-reference capabilities may be provided which are able to identify different variations and occurrences of a given entity occurring several times in a document. For instance, the user may highlight the term "ABC Co." within the text will be potentially interested in finding as well every occurrence of the phrase "The Document Company" (also usually designating "ABC Co."); and in the same way, the user highlighting the string "CEO" within the text may be interested in tracking also its pronominal co-references such as "he" or "she" in the same text. Co-reference extraction can even be extended to retrieving a chain of entities that all refer to the same given entity (e.g., a person name being further linked with extracted "birth date" and "birth place, etc). For extracting these referential text fragments, specific rules may be stored in memory.

Figure 13:
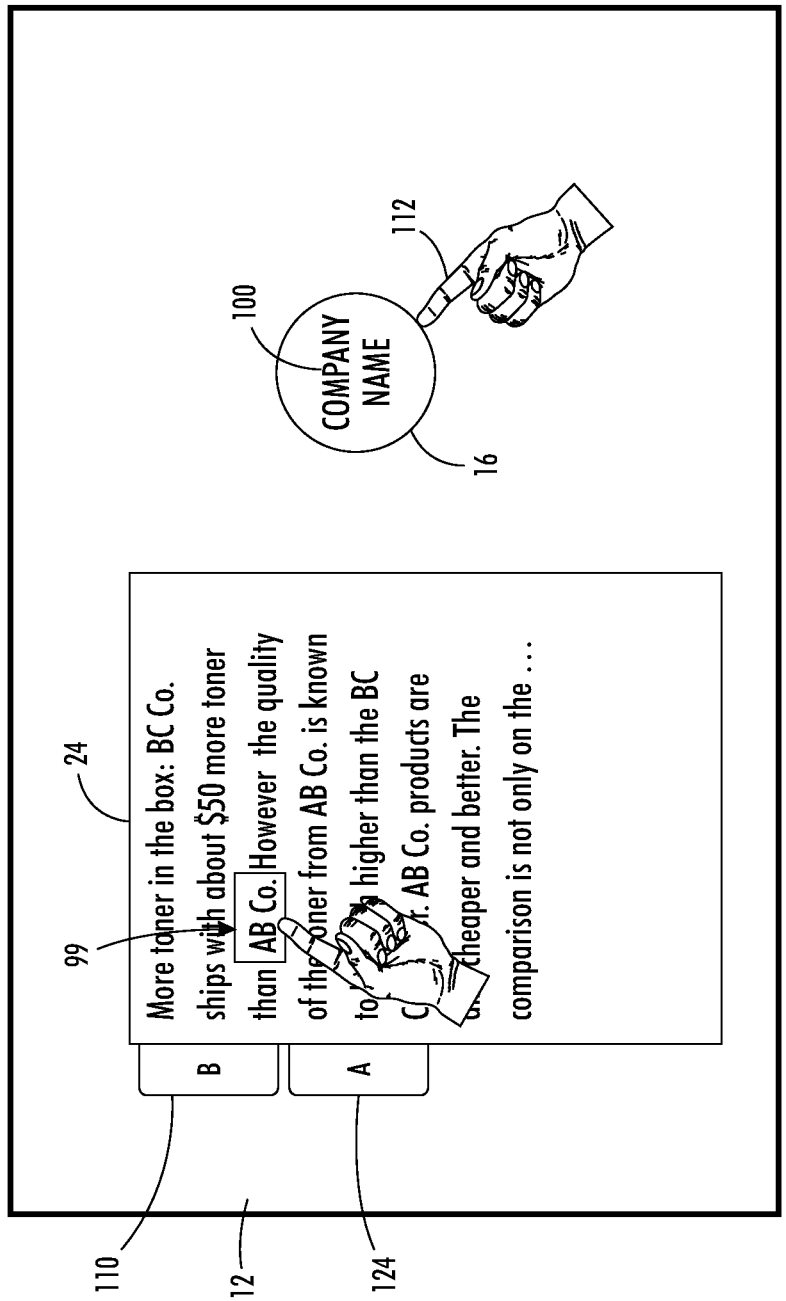
FIG. 13 is a screenshot illustrating generating an advanced query in accordance with one embodiment.

For generating a class of named entities, the user identifies, by highlighting, a text fragment corresponding to a named entity which is an instance of the class. The user may also specify that the advanced mode is to be employed, for example, by tapping on an advanced mode tab 124 (FIG. 13) displayed adjacent the document 24. Alternatively, the advanced mode may be implemented by selecting a particular type of magnet which is specified for advance mode queries (as the case of the AND and OR magnets) or through a particular type of virtual bridge gesture which is different from that used in the basic mode. In yet another embodiment, an icon on the wheel menu on the magnet 16 may be utilized to select basic or advanced searching.

The user highlights with a finger 17 a text fragment 99 such as "November $16^{th}$" within a document 24. The system runs the parser 70 with the NER 120 to identify a class C of entities to which this text-entry may belong. The matching class, if any, is identified and a magnet 16 may automatically pop up close to the currently displayed document 24, with the name of the associated named entity class displayed on top of it (e.g., "DATES"). The system associates this entity class with the magnet 16.

Whenever the user afterwards moves this magnet 16 to the current document 24 or to another document displayed on the touch screen, the parser 70 is launched to parse the whole document content in order to extract all occurrences which match the entity class C (e.g., "12/11/2003" or "December 2010" in the case of the DATE class). As with the basic search magnet, matches can be either highlighted directly within the text (locally or more generally, depending on the magnet position is over the text or adjacent to it), and/or pulled out from the text to provide a visual effect of the quantity.

In some embodiments, the system operated by associating the entity class with a rule or more generally, a set of predefined rules for identifying instances of this class with magnet 16. The rules in the above example may include the rule(s) which the parser 70 used for identifying that November $16^{th}$ is a date as well as other parser rules for identifying other date forms, such as 11/16/2011). Or, the rules for identifying instances of class C may be more limited than the general DATE rules, for example, only to identify dates which could be within a time window of for example, twenty or fifty years from the current date in a litigation context.

In the same way, to search for company names within a document set, the user can first open one document containing, for example the text fragment "AB Co." By highlighting the string "AB Co." and activating an advanced search magnet, a new query magnet labeled as "Company names" is generated that the user can further apply to the document collection or selected part of it. Documents containing other company names, such as "BC Co." and "DE, Inc." will be attracted around the magnet.

Sweeping a single document with the "Company Name" magnet 16 may highlight each instance of a company name (which the parser identifies based on the entity rules) when applied to the next textual section of the document.

Figure 14:
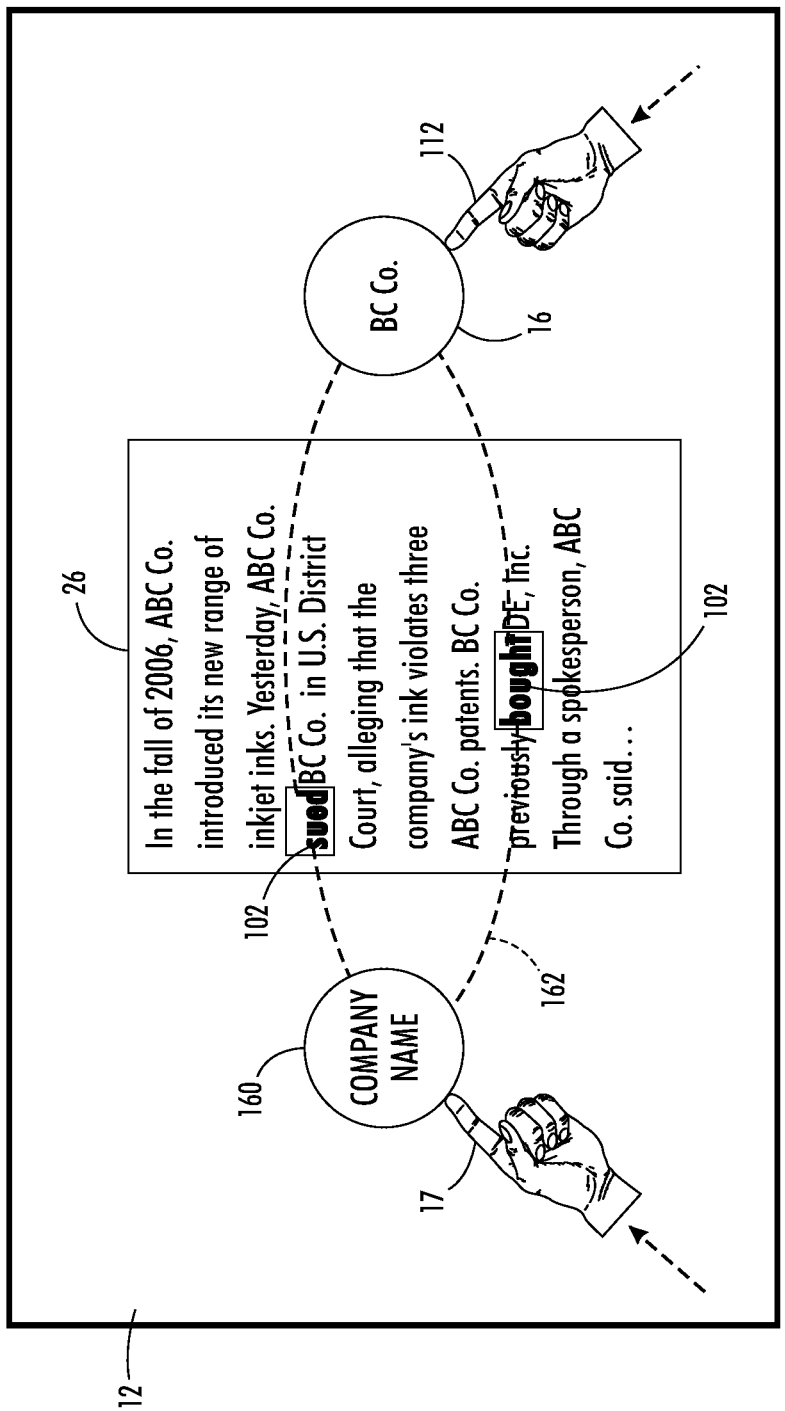
FIG. 14 is a screenshot illustrating applying an event query to a document using two magnets in accordance with one embodiment.

Syntactic relations output by the parser, together with the named entities detected by the parser, can also be used for extracting events. In one embodiment, a combination of entity extraction magnets is used to achieve simple event extraction in conjunction with the parser 70. For example, the combination of two different entity magnets 16, 160 each representing a named entity or an entity class, can be used to extract the verb part of a matching event. For example, the user first activates a query magnet 16 in a basic search mode with the text fragment 99 "BC Co." using a text entry highlighted from a document 24. The user further activates a second query magnet 160 with advanced search capabilities by extending a text fragment corresponding to a company name (e.g., AB Co.) to "Company Names." The two magnets 16, 160 applied concurrently onto the same text automatically extract the text fragments 102 ("sued" and "bought") as part of a respective event involving these two entities, as illustrated in FIG. 14. These events are extracted by the parser, using the event extraction rules.

The events extracted by the two magnet actions can be identified, for example, by highlighting the words 102 directly within the text or by displaying them spanning over the document image between the magnets as small word pictures. In some embodiments, arrows 162 or other identifiers may be used to highlight the event words.

In the exemplary embodiment, the named entities participating in the event are not specified as being the subject and object respectively (or, in another embodiment, the agent and patient respectively). Thus, in the illustrated example, BC Co. is the subject in one event and the object in another. In other embodiments, the order in which the two named entities are selected determines whether the named entity is the subject or the object in a sentence. For example, if BC Co. is selected first, the event rule requires BC Co. to be the subject in the event, as in the identified event ("BC Co.", bought, "DE, Inc.").

To distinguish the event extraction mode from a mode in which the two magnets 16 and 160 are used in an AND mode, the user may be required position the entity magnets in a particular location, e.g., close to the opposite sides of the document 24. For activating the AND mode, the magnets 16 and 160 may be placed adjacent the same side of the document.

In other embodiments, an event can be generated with a single magnet. For example, the user may find the text fragment 99 "Bill and Kate met at St. Andrews University", "Bill"

and "Kate" which are already tagged as PERSON type named entities, are tagged through their syntactic functions as the subject. The verb "met", which is already tagged as a verb, is syntactically associated with the subject and with the LOCATION entity "St Andrews University". The three components, [VERB+PERSON entities+LOCATION entity] can thus generate an event that the user may want to retrieve within the text. The event can be designated, on the magnet, through the verbal part in its inflected form ("met"), or can be designated through the verbal part in its infinitive form ("to meet"), or can be generalized to a class of events of the form "MEETING event" through a rule that will match any predicate of the form [VERB=to meet+PERSON entities as _SUBJ+LOCATION entity as _TIME_COMP]. The user inputting as a text entries X="Bill and Kate" and Y="St Andrews University" will receive as output any event matching these two inputs as its constituents, and, for example, will get in return a MEETING event, with the verbal part "met" highlighted in text as a result of her query. In another embodiment, the user could populate an advanced magnet with the text entry "met" further recognized as a verbal chunk by the parser, which will try to match all the event classes involving that verb into their event rule definition. The user may get as a result of the query the two entities participating in a MEETING event: that is "Bill and Kate" as PERSON entities and "St. Andrews University" as LOCATION entity for the example text string above.

In one embodiment, the "MEETING event" definition can employ a pre-compiled list of verbs all defining and expanding a meeting event to a broader definition (e.g., meet={"to meet", "to assemble", "to join", "to gather"}) to be used in conjunction with the rule defining any predicate of the form [VERB=meet-list+PERSON entities as _SUBJ+LOCATION entity as _TIME_COMP] so that an advanced magnet populated with the text entry "met" will match more meeting events including, for example, matches with sentences such as "Bill, John and Mary assembled at the airport." The user may also receive, as a result of the query, the two entities participating in a MEETING event: that is "Bill, John and Mary" as PERSON entities and "the airport" as a LOCATION entity.

As will be appreciated, the updating of magnets for use in the advanced mode and event extraction can be performed by the query generator in a similar manner to that described for the basic mode, except in that the query generated need not use identical terms to those highlighted by a user. For example, when the query is a named entity class, such as DATE, the query associated in memory with the magnet includes a class name or a corresponding set of rules, or links the magnet ID to an entity class name and/or a set of rules stored elsewhere in memory for identifying named entities in that class.

3. Glance Mode

Figure 15:
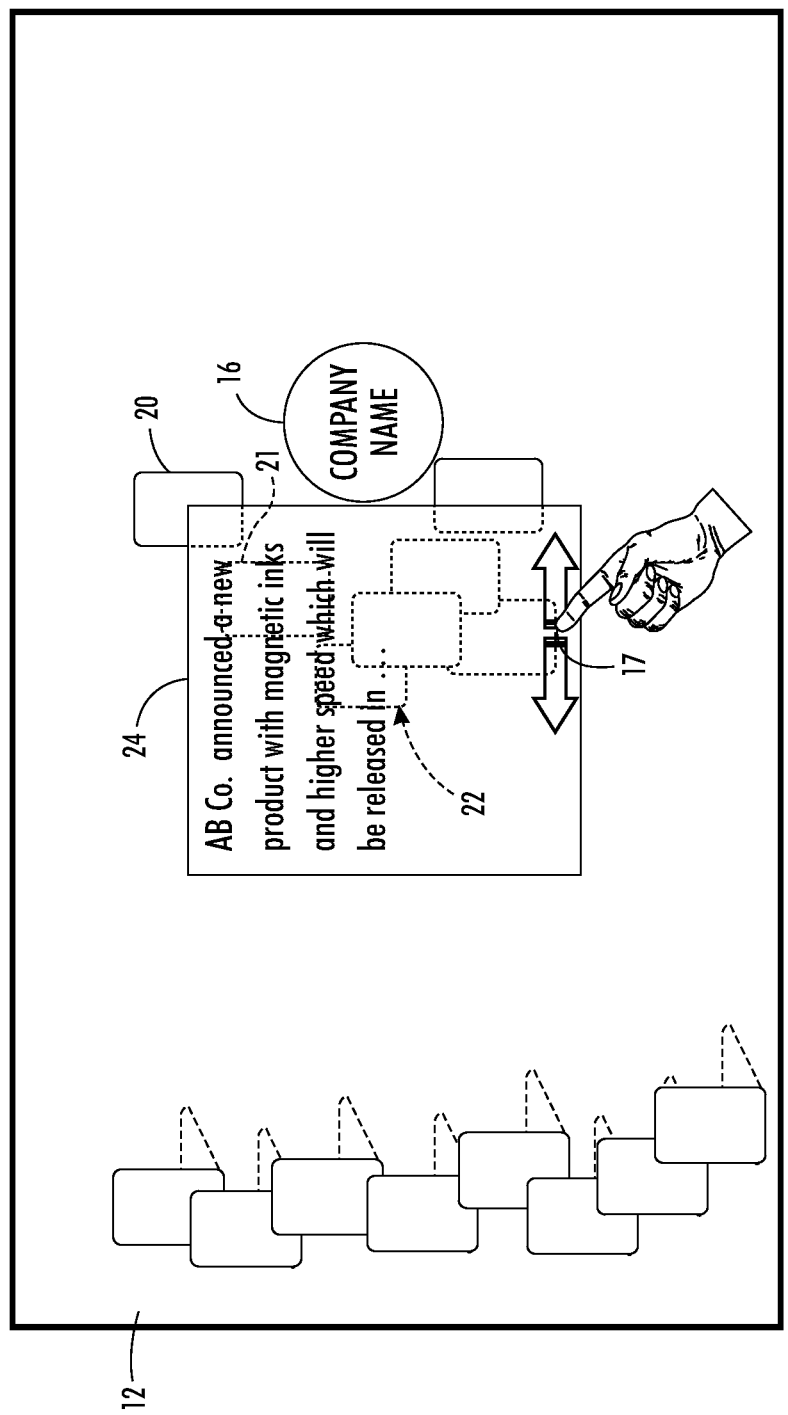
FIG. 15 illustrates a glance view in one aspect of the exemplary embodiment.

In some embodiments, the exemplary magnet facilitates a glance mode. When a basic or an advanced search query magnet 16, 160 has been applied on a set of graphic objects rather than on a single document, the TUI displays a small cloud of graphic objects being attracted and grouped around the magnet. The user may wish to see the kind of documents that the search retrieved, without the need for walking through all the documents from the result set. In the glance mode, the user uses a predefined gesture which opens one of the documents (FIG. 15). The document automatically disappears after a short period of time, such as within two to five seconds. For example, the user quickly sweeps the cloud of graphic objects 20, 21, 22, etc. with a tangible object/one or more fingers 17 sweeping from right to left one or more times on the image of the group of graphic objects displayed close to the magnet 16. The system randomly chooses one of the documents from the result set and opens it on top of the result set. The document 24 and graphic objects are thus displayed at the same time on the screen. The document remains open for a few seconds, i.e., just enough time for the user to have a look at the text, and then automatically vanishes. If the user sweeps the result cloud again, another document is randomly chosen and displayed.

4. Dynamic Update through Displayed Keywords

Figure 16:
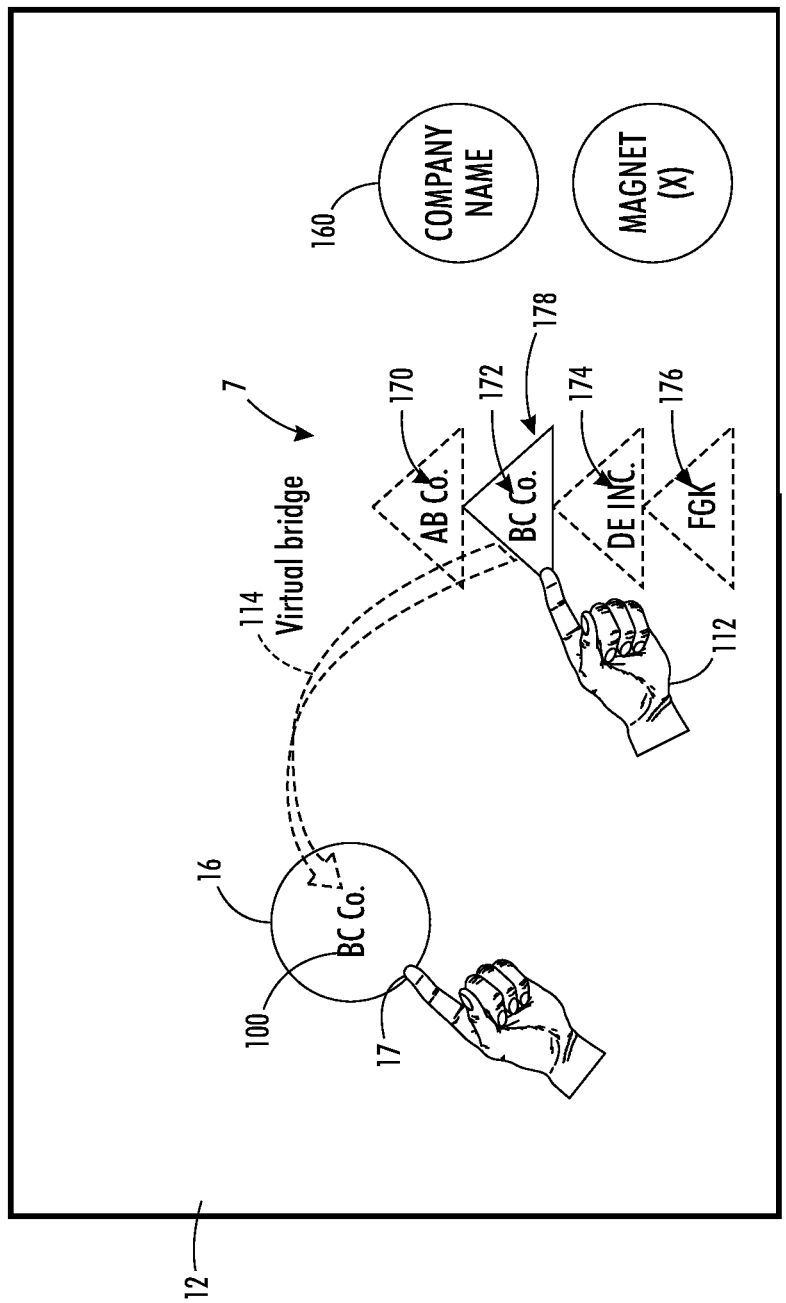
FIG. 16 illustrates use of a virtual bridge for updating a magnet with a displayed keyword.

With reference now to FIG. 16, dynamic update of a magnet can also be achieved through the virtual bridge gesture as described with reference to FIG. 11, but in this case, the magnet is at least partly updated from a list of words or tokens displayed on the tabletop (S136). In this embodiment, a set 79 of keywords 170, 172, 174, 176, such as word(s) or other strings of characters, is already displayed on the multi-touch table screen 12. These keywords are user selectable, e.g., they are located in clickable zones where they can be selected through simple finger touch actions to be identified by the touch detection system 38. The user first chooses and drags a magnet 16. The selected magnet can be a free, not-yet-activated magnet or a magnet that has already been updated with other content. Then, the user operates the virtual bridge gesture in which the source and destination are touched sequentially. For example, the user first selects a keyword 172 on the screen and positions a finger 112 in touching contact with an area 178 in which the keyword is displayed. Then, with a finger 17 of the other hand, the user operates a single touch or other recognized touch contact, on the destination, that is, on the magnet 16 that the user wants to activate (while keeping the first finger in contact with the keyword 172). These actions result in an updated query magnet which may be labeled with the keyword forming the query 100. The magnet is then ready to perform a string match between the keyword and any single document content, or on a cloud of documents.

The displayed keywords may be generated automatically by applying a clustering method to the documents and extracting words which are frequent in the respective cluster but which also distinguish that cluster from the others. The keywords may alternatively be stored in the configuration file and may come from other sources such as reviewer guidelines, lists of terms arising from an agreement between the two parties during a litigation case, or the like.

In some embodiments, the keywords may be selected by the user. For example, the user may find a word in document that is useful for querying and may drag and drop it, e.g., with a finger touch, to the side of the screen, where it is displayed and can be used again later.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for dynamically generating a query comprising:
   displaying a set of graphic objects on the display device, each graphic object representing one of a set of text documents;
   providing a virtual magnet which is movable on a display device of a tactile user interface in response to touching on the tactile user interface, the virtual magnet being capable of drawing graphic objects in the set of graphic objects towards it or repelling them;

providing for a user to select one of the set of text documents, including providing for the user to select one of the graphic objects;

displaying the selected text document on the display device;

recognizing a highlighting gesture on the tactile user interface over the displayed document as a selection of a text fragment from text content of the document; and populating the virtual magnet with a query which is based on the text fragment selected from the displayed text document by the highlighting gesture, whereby the populated magnet is configured for causing at least one of:

at least a subset of displayed graphic objects to exhibit a response to the magnet as a function of the query and text content of respective documents which the graphic objects represent, the response including the virtual magnet drawing the subset of graphic objects towards it or repelling them; and responsive instances of the query to be displayed in a text document.

2. The method of claim 1, wherein the populating is performed with a computer processor.

3. The method of claim 1, wherein the providing for the user to select one of the set of text documents includes causing a subset of the graphic objects to exhibit a response to the magnet as a function of an attribute of each of the items represented by the graphic objects in the subset.

4. The method of claim 1, wherein the recognizing includes detecting a first touch contact on the displayed text document as a highlighting gesture and extracting a corresponding highlighted text fragment.

5. The method of claim 4, further comprising detecting a second touch contact on the virtual magnet as generating a virtual bridge between the first and second contacts which updates the query based on the highlighted text fragment.

6. The method of claim 1, further providing a plurality of populating modes including:

a basic mode in which the populating is based on the selected text fragment; and an advanced mode in which an entity class or parser rule is identified which is satisfied by the selected text fragment, the populating being based on the entity class or parser rule.

7. The method of claim 6, wherein in the advanced mode, an entity class is identified, which is satisfied by the selected text fragment, to generate the query, the entity class being a named entity class which identifies named entities in a named entity class.

8. The method of claim 7, wherein the named entity class is selected from a predefined set of named entity classes.

9. The method of claim 8, wherein the set of named entity classes includes a plurality of named entity classes selected from the group consisting of: a PERSON NAME class, an ORGANIZATION class, a DATE class, a LOCATION class, and subclasses thereof.

10. The method of claim 1, further comprising at least one of:

displaying responsive instances in a displayed text document when the populated magnet is positioned below a threshold distance from the displayed text document; and moving the subset of displayed graphic objects towards the magnet as a function of the query and text content of respective documents which the graphic objects represent when the populated magnet is positioned below a threshold distance from the displayed graphic objects.

11. The method of claim 1, wherein the populating of the virtual magnet with a query comprises applying a parser to at least a portion of the text document including the selected text fragment to identify an entity or entity class and the method further comprises applying the same parser with the entity or entity class to a displayed text document and displaying responsive instances of the entity or entity class in the displayed text document.

12. The method of claim 1, wherein the populating of the virtual magnet with a query comprises applying a parser to at least a portion of the text document including the selected text fragment to identify an entity or entity class and the method further comprises applying the parser with the entity or entity class to a set of text documents to identify instances of the entity or entity class and automatically moving the subset of displayed graphic objects towards the magnet as a function of the query and parsed text content of respective documents, whereby one or more of the displayed graphic objects is separated from others of the displayed graphic objects.

13. The method of claim 1, wherein the populating comprises:

providing for a first virtual magnet to be populated with a first part of a query based on a text fragment of a displayed document;

providing for a second virtual magnet to be populated with a second part of the query based on a text fragment of a displayed document;

whereby the query is applied to a displayed document by positioning the first and second magnets so that they are, at the same time, within a threshold distance of the document.

14. The method of claim 13, wherein the query comprises an event query and the first part of the query comprises a first named entity or entity class and the second part of the query comprises a second named entity or entity class, whereby by positioning the first and second magnets in an arrangement with a displayed document, events which include the first named entity or entity class and second named entity or entity class are identified.

15. The method of claim 1, wherein the magnet is populated with the query without using any key entry device.

16. The method of claim 1, wherein the virtual magnet moves position on the display device in response to touching on the touch-screen with at least one of a finger and another physical implement.

17. The method of claim 1, wherein the highlighting gesture is performed with a finger or other physical implement.

18. The method of claim 1, wherein the populating of the virtual magnet with the query further includes providing for a user to select a query term from a finite set of displayed query terms, the query being based on the text fragment selected from the displayed text document and the selected query term.

19. The method of claim 1, further comprising providing a glance mode in which a predefined gesture implemented with a tangible object or one or more fingers over a displayed graphic object causes a respective text document to be displayed only temporarily.

20. A computer program product comprising a non-transitory recording medium encoding instructions which, when executed by a computer, perform the method of claim 1.

21. A system for dynamically generating a query comprising:

instructions stored in memory for performing the method of claim 1;

a processor in communication with the memory for executing the instructions; and a tactile user interface in communication with the processor for receiving touch commands and for displaying the graphic objects, text documents, and virtual magnet.

22. A tactile user interface comprising:

a display device comprising a touch-screen;

instructions stored in memory for:

displaying a set of graphic objects on the display, each graphic object representing a respective text document, causing a virtual magnet to move on the display device in response to touching on the touch-screen, the virtual magnet being capable of drawing graphic objects in the set of graphic objects towards it or repelling them, displaying one of the text documents in response to selection of a respective one of the graphic objects, recognizing a highlighting gesture over the displayed text document as selection of a fragment of the text in the displayed text document, populating the magnet with a query based on the selected text fragment; and causing the magnet populated with the query to move close to a displayed document in response to touching on the touch-screen and displaying responsive instances of the query in the displayed text document; and a processor in communication with the memory and display device for executing the instructions.

23. The tactile user interface of claim 22, wherein the virtual magnet comprises a plurality of virtual magnets which are displayed on the display.

24. The tactile user interface of claim 23, wherein each of a plurality of the virtual magnets is populatable with a respective query part which in combination form a combined query.

25. The tactile user interface of claim 22, wherein the instructions comprise a parser configured for recognizing named entities and wherein the query includes a named entity class of which the selected text fragment is an instance.

26. The method of claim 1, wherein the populated magnet is configured for automatically causing responsive instances of the query to be displayed in the text document.

* * * * *